US010486553B2

(12) United States Patent
Hirayama et al.

(10) Patent No.: US 10,486,553 B2
(45) Date of Patent: Nov. 26, 2019

(54) VEHICLE SYSTEM, VEHICLE CONTROL METHOD, AND STORAGE MEDIUM

(71) Applicant: HONDA MOTOR CO., LTD., Minato-ku, Tokyo (JP)

(72) Inventors: Kenta Hirayama, Shioya-gun (JP); Hajime Ishihara, Utsunomiya (JP); Manabu Matsumoto, Utsunomiya (JP); Muneatsu Minato, Utsunomiya (JP); Yosuke Nishimura, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 53 days.

(21) Appl. No.: 15/879,556

(22) Filed: Jan. 25, 2018

(65) Prior Publication Data
US 2018/0222347 A1    Aug. 9, 2018

(30) Foreign Application Priority Data
Feb. 3, 2017    (JP) .................................. 2017-019087

(51) Int. Cl.
*B60N 2/02*    (2006.01)
*B60N 2/10*    (2006.01)
(Continued)

(52) U.S. Cl.
CPC ............. *B60N 2/02* (2013.01); *B60N 2/0276* (2013.01); *B60N 2/14* (2013.01); *B60N 2/767* (2018.02);
(Continued)

(58) Field of Classification Search
CPC .......... B60N 2/02; B60N 2/0232; B60N 2/10; A47C 27/082; B60R 21/01554; B60R 21/015; B60R 21/207
See application file for complete search history.

(56) References Cited

U.S. PATENT DOCUMENTS 5,176,424 A * 1/1993 Tobita .................. A47C 27/082
297/284.1
2003/0023363 A1   1/2003 Katz et al.
(Continued)

FOREIGN PATENT DOCUMENTS

JP     05-069771      3/1993
JP     2003-532577    11/2003
(Continued)

OTHER PUBLICATIONS

Japanese Notice of Allowance for Japanese Patent Application No. 2017-019087 dated Feb. 5, 2019.
(Continued)

*Primary Examiner* — Yuri Kan
(74) *Attorney, Agent, or Firm* — Amin, Turocy & Watson LLP

(57) ABSTRACT

A vehicle system includes a seat state acquisition unit (160) that acquires an orientation about a vertical axis of a seat on which an occupant of a vehicle sits, a vehicle state acquisition unit (170) that acquires a current or future acceleration relating to the vehicle, and a seat control unit (180) that deforms at least a part of the seat on the basis of the orientation of the seat acquired by the seat state acquisition unit and the acceleration acquired by the vehicle state acquisition unit.

11 Claims, 16 Drawing Sheets

(51) Int. Cl.
  *B60W 30/02* (2012.01)
  *B60W 50/00* (2006.01)
  *B60N 2/14* (2006.01)
  *B60N 2/75* (2018.01)
  *B60N 2/90* (2018.01)

(52) U.S. Cl.
  CPC ............ *B60N 2/773* (2018.02); *B60N 2/986* (2018.02); *B60W 30/025* (2013.01); *B60W 50/0097* (2013.01); *B60W 50/0098* (2013.01); *B60N 2002/022* (2013.01); *B60W 2520/105* (2013.01); *B60W 2520/125* (2013.01); *B60W 2520/14* (2013.01)

(56) References Cited

U.S. PATENT DOCUMENTS

2015/0175111 A1* 6/2015 Muramatsu ....... B60R 21/01516
                                                                702/150
2015/0306982 A1* 10/2015 Hamabe ............... B60N 2/0244
                                                                701/49

FOREIGN PATENT DOCUMENTS

| JP | 2007-237852 | | 9/2007 | |
|----|----|----|----|----|
| JP | 2007223490 A | * | 9/2007 | ........... B60N 2/0232 |
| JP | 2007-253883 | | 10/2007 | |
| JP | 2010-064632 | | 3/2010 | |
| JP | 2011-084195 | | 4/2011 | |
| JP | 2013-216209 | | 10/2013 | |
| JP | 2014-034356 | | 2/2014 | |
| JP | 2015-136954 | | 7/2015 | |
| JP | 2015-205562 | | 11/2015 | |
| JP | 2016-074244 | | 5/2016 | |
| JP | 2016074244 A | * | 5/2016 | ........... B60R 21/207 |
| JP | 2016-175513 | | 10/2016 | |
| JP | 2016175513 A | * | 10/2016 | ....... B60R 21/01554 |
| JP | 2017-170941 | | 9/2017 | |
| WO | 2015/037600 | | 3/2015 | |

OTHER PUBLICATIONS

Japanese Office Action for Japanese Patent Application No. 2017-019087 dated Sep. 25, 2018.

* cited by examiner

FIG. 6
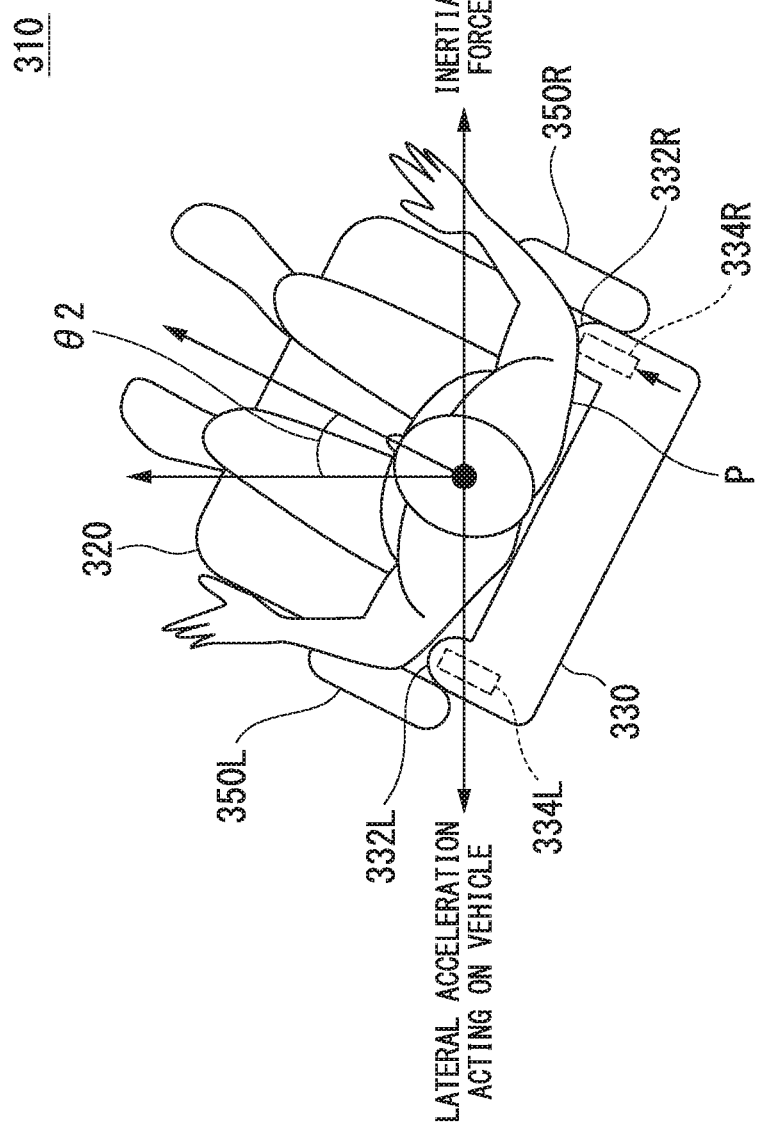
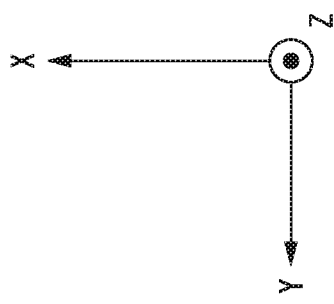

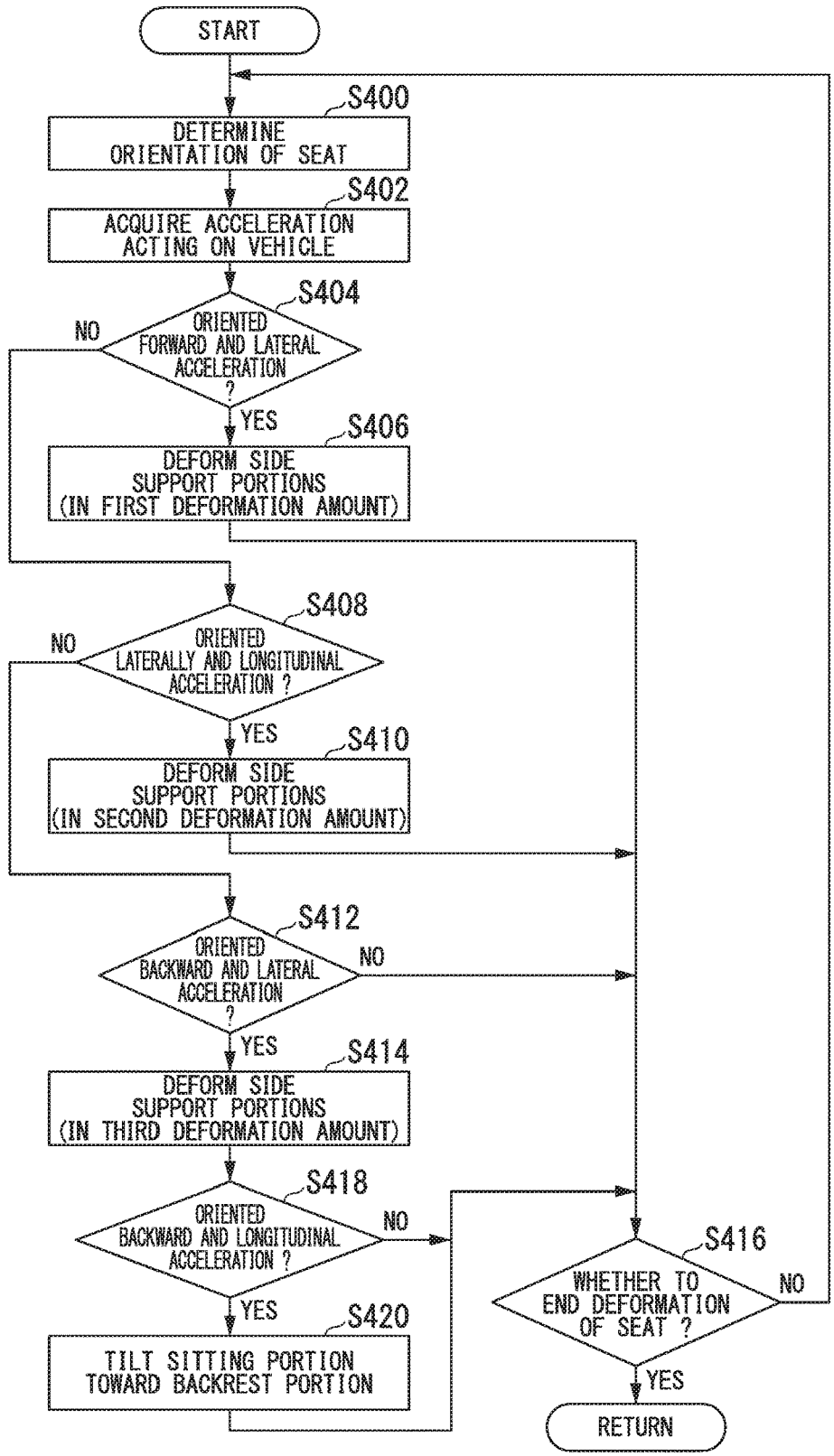

VEHICLE SYSTEM, VEHICLE CONTROL METHOD, AND STORAGE MEDIUM

CROSS-REFERENCE TO RELATED APPLICATION

Priority is claimed on Japanese Patent Application No. 2017-019087, filed Feb. 3, 2017, the content of which is incorporated herein by reference.

BACKGROUND OF THE INVENTION

Field of the Invention

The present invention relates to a vehicle system, a vehicle control method, and a storage medium.

Description of Related Art

Recently, technologies for controlling the position of a seat on which an occupant sits in a vehicle on the basis of the travel state of the vehicle have been under research. In connection with this, technologies in which an occupant sitting on a seat is dynamically supported in a lateral direction when the vehicle travels on a curved section or a pitching behavior at the time of changing the speed of the vehicle is predicted and the posture of the seat is changed to cancel out the predicted pitching behavior have been disclosed (see, for example, Published Japanese Translation No. 2003-532577 of the PCT international Publication and Japanese Unexamined Patent Application, First Publication No. 2007-253883).

SUMMARY OF THE INVENTION

However, such technologies of the related art do not perform control to support the body of the occupant according to changes in the orientation of the seat or according to the state of the vehicle.

The present invention has been made in view of the above circumstances and it is an object of the present invention to provide a vehicle system, a vehicle control method, and a storage medium which can realize seat forms more suitable for changes in the orientation of the seat or the state of the vehicle.

The vehicle system, the vehicle control method, and the storage medium according to the present invention employ the following configurations.

(1) A vehicle system according to an aspect of the present invention includes a seat state acquisition unit configured to acquire an orientation about a vertical axis of a seat on which an occupant of a vehicle sits, a vehicle state acquisition unit configured to acquire a current or future acceleration relating to the vehicle, and a seat control unit configured to deform at least a part of the seat on the basis of the orientation of the seat detected by the seat state acquisition unit and the acceleration acquired by the vehicle state acquisition unit.

(2) In the above aspect (1), the seat includes a plurality of side support portions configured to support a body of the occupant at different sides, and the seat control unit is configured to deform at least one of the plurality of side support portions which corresponds to a combination of the orientation of the seat and a direction of the current or future acceleration relating to the vehicle acquired by the vehicle state acquisition unit.

(3) In the above aspect (2), the seat control unit causes one of the plurality of side support portions, which is located on a side opposite to a direction in which a lateral acceleration acts on the vehicle, to protrude toward the occupant.

(4) In the above aspect (2), the seat control unit makes an amount of deformation of the at least one side support portion in a case that a longitudinal acceleration acts on the vehicle in a case in which the orientation of the seat detected by the seat state acquisition unit is lateral with respect to a travel direction of the vehicle greater than an amount of deformation of the at least one side support portion in a case that a lateral acceleration acts on the vehicle in a case in which the orientation of the seat is forward with respect to the travel direction of the vehicle.

(5) In the above aspect (2), the seat includes an armrest for supporting an arm of the occupant, and the seat control unit is configured to deform the armrest in addition to deforming the at least one side support portion in a case that the future acceleration acquired by the vehicle state acquisition unit is equal to or greater than a threshold value.

(6) In the above aspect (5), the armrest includes a bag-like member configured to store a gas or liquid, and the seat control unit is configured to inject the gas or liquid into the bag-like member to expand the bag-like member downward from the armrest.

(7) In the above aspect (2), the seat control unit is configured to tilt a sitting portion of the seat in addition to deforming the at least one support portion in a case that a future longitudinal acceleration acquired by the vehicle state acquisition unit is equal to or greater than a threshold value in a case in which the orientation of the seat detected by the seat state acquisition unit is backward with respect to a travel direction of the vehicle.

(8) In the above aspect (2), the seat control unit makes an amount of deformation of the at least one side support portion in a case that a longitudinal acceleration acts on the vehicle in a case in which the orientation of the seat detected by the seat state acquisition unit is backward with respect to a travel direction of the vehicle greater than an amount of deformation of the at least one side support portion in a case that a lateral acceleration acts on the vehicle in a case in which the orientation of the seat is forward with respect to the travel direction of the vehicle.

(9) In the above aspect (8), the seat control unit makes an amount of deformation of the at least one side support portion in a case that a longitudinal acceleration acts on the vehicle in a case in which the orientation of the seat detected by the seat state acquisition unit is backward with respect to the travel direction of the vehicle greater than an amount of deformation of the at least one side support portion in a case that a lateral acceleration acts on the vehicle in a case in which the orientation of the seat is lateral with respect to the travel direction of the vehicle.

(10) A vehicle control method using an in-vehicle computer, according to an aspect of the present invention includes an in-vehicle computer acquiring an orientation about a vertical axis of a seat on which an occupant of a vehicle sits, acquiring a current or future acceleration relating to the vehicle, and deforming at least a part of the seat on the basis of the acquired orientation of the seat and the acquired acceleration.

(11) A non-transitory computer-readable storage medium according to an aspect of the present invention is configured to store a vehicle control program causing an in-vehicle computer to acquire an orientation about a vertical axis of a seat on which an occupant of a vehicle sits, acquire a current or future acceleration relating to the vehicle, and deform at least a part of the seat on the basis of the acquired orientation of the seat and the acquired acceleration.

According to the above aspects (1), (10), and (11), it is possible to realize seat forms more suitable for changes in the orientation of the seat or the state of the vehicle.

According to the above aspect (2) (3), even in a case that the orientation of the seat has changed, the side support portions support the posture such that a feeling is close to a previous feeling, and therefore it is possible to maintain comfort.

According to the above aspect (4), even in a case that a longitudinal acceleration acts in a state in which the seat is oriented laterally, it is possible to support the body of the occupant.

According to the above aspect (5), the body of the occupant can be supported more securely than in a case that supported only by the side support portions.

According to the above aspect (6), it is possible to support the body of the occupant over a wide range by using the armrest.

According to the above aspect (7), the body of the occupant can be supported more securely than in a case that supported only by the side support portions.

According to the above aspect (8) or (9), even in a case that a longitudinal acceleration acts in a state in which the seat is oriented backward, it is possible to more securely support the body of the occupant.

BRIEF DESCRIPTION OF THE DRAWINGS

FIG. 6 is a view showing the operation of the seat in a case that the orientation of the seat device 300 is forward.

FIG. 16 is a flowchart showing a flow of seat control of the fourth embodiment.

DETAILED DESCRIPTION OF THE INVENTION

Hereinafter, embodiments of a vehicle system, a vehicle control method, and a storage medium of the present invention will be described with reference to the drawings. In the embodiments, it is assumed that the vehicle system is applied to an automated driving vehicle. Here, automated driving refers to, for example, automatically controlling at least one of acceleration/deceleration or steering of a vehicle to cause the vehicle to travel.

First Embodiment

[Overall Configuration]

Figure 1:
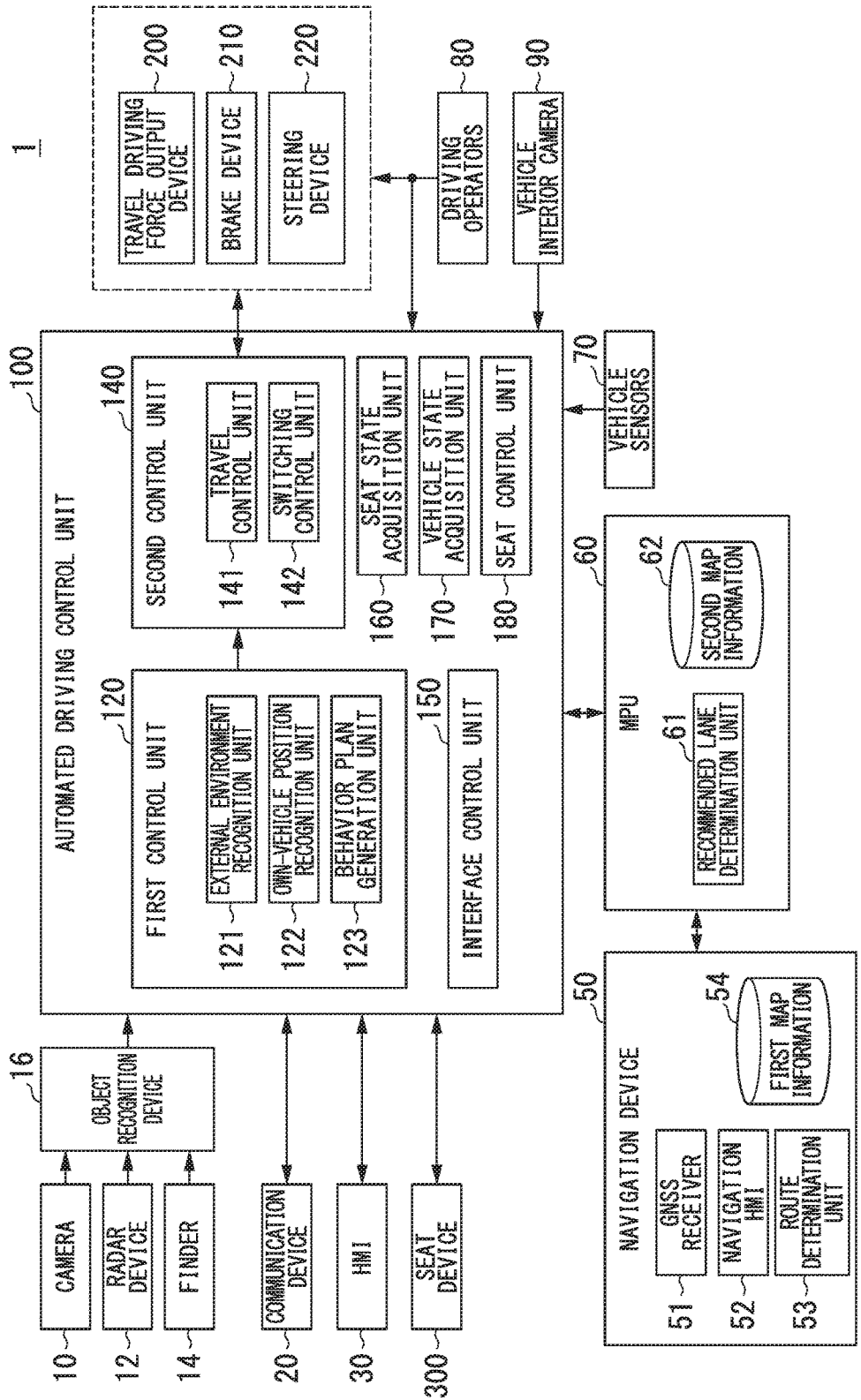
FIG. 1 is a configuration diagram of a vehicle system according to a first embodiment.

FIG. 1 is a configuration diagram of a vehicle system 1 according to a first embodiment. A vehicle in which the vehicle system 1 is mounted (hereinafter referred to as a vehicle M) is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera 10, a radar device 12, a finder 14, an object recognition device 16, a communication device 20, a human machine interface (HMI) 30, a navigation device 50, a micro-processing unit (MPU) 60, vehicle sensors 70, driving operators 80, a vehicle interior camera 90, an automated driving control unit 100, a travel driving force output device 200, a brake device 210, a steering device 220, and a seat device 300. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

The camera 10 is, for example, a digital camera using a solid-state imaging device such as a charge coupled device (CCD) or complementary metal oxide semiconductor (CMOS) image sensor. One or a plurality of cameras 10 may be attached to the vehicle M, in which the vehicle system 1 is mounted, at arbitrary locations. For imaging the area in front of the vehicle, a camera 10 is attached to an upper portion of a front windshield, a rear surface of a rearview mirror, or the like. For imaging the area behind the vehicle, a camera 10 is attached to an upper portion of a rear windshield, a back door, or the like. For imaging the area to the side of the vehicle, a camera 10 is attached to a door mirror or the like. For example, the camera 10 repeats imaging of the surroundings of the vehicle M at regular intervals. The camera 10 may also be a stereo camera.

The radar device 12 radiates radio waves such as millimeter waves around the vehicle M and detects radio waves reflected by an object (reflected waves) to detect at least the position (distance and orientation) of the object. One or a plurality of radar devices 12 may be attached to the vehicle M at arbitrary locations. The radar device 12 may detect the position and velocity of an object using a frequency modulated continuous wave (FMCW) method.

The finder 14 is a light detection and ranging or laser imaging detection and ranging (LIDAR) finder which measures scattered light from an object in response to illuminated light to detect the distance to the object. One or a plurality of finders 14 may be attached to the vehicle M at arbitrary locations.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control unit 100.

For example, the communication device 20 communicates with other vehicles near the vehicle M using a cellular network, a Wi-Fi network, Bluetooth (registered trademark), dedicated short range communication (DSRC) or the like or communicates with various server devices via wireless base stations. The communication device 20 also communicates with a terminal device held by a person outside the vehicle.

The HMI 30 presents various types of information to an occupant in the vehicle and receives an input operation from the occupant. The HMI 30 includes, for example, any of various display devices, a speaker, a buzzer, a touch panel, any of various operating switches, a key, or the like.

The navigation device 50 includes, for example, a global navigation satellite system (GNSS) receiver 51, a navigation HMI 52, and a route determination unit 53 and holds first map information 54 in a storage device such as a hard disk drive (HDD) or a flash memory. The GNSS receiver specifies the position of the vehicle M on the basis of signals received from GNSS satellites. The position of the vehicle M may also be specified or it may be supplemented by an inertial navigation system (INS) using the output of the vehicle sensors 70. The navigation HMI 52 includes a display device, a speaker, a touch panel, a key, or the like. The navigation HMI 52 may be partly or wholly shared with the HMI 30 described above. For example, the route determination unit 53 determines a route from the position of the vehicle M specified by the GNSS receiver 51 (or an arbitrary input position) to a destination input by the occupant using the navigation HMI 52 (for example, a route including information regarding waypoints on the route of travel to the destination) by referring to the first map information 54. The first map information 54 is, for example, information representing shapes of roads by links indicating roads and nodes connected by the links. The first map information 54 may include curvatures of roads, point of interest (POI) information, or the like. The route determined by the route determination unit 53 is output to the MPU 60. The navigation device 50 may also perform route guidance using the navigation HMI 52 on the basis of the route determined by the route determination unit 53. The navigation device 50 may be realized, for example, by a function of a terminal device such as a smartphone or a tablet possessed by the user. The navigation device 50 may also transmit the current position and the destination to a navigation server via the communication device 20 and acquire a route returned from the navigation server.

The MPU 60 functions, for example, as a recommended lane determination unit 61 and holds the second map information 62 in a storage device such as an HDD or a flash memory. The recommended lane determination unit 61 divides the route provided from the navigation device 50 into a plurality of blocks (for example, into blocks each 100 meters long in the direction in which the vehicle travels) and determines a recommended lane for each block by referring to the second map information 62. The recommended lane determination unit 61 determines the recommended lane such that the recommended lane is given a position in a lane order counted from the leftmost lane. In a case that there is a branch point, a merge point, or the like on the route, the recommended lane determination unit 61 determines a recommended lane such that the vehicle M can travel on a reasonable travel route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulations information, address information (addresses/postal codes), facility information, telephone number information, or the like. The road information includes information indicating the types of roads such as expressways, toll roads, national roads, or prefectural roads or information such as the number of lanes of each road, regions of emergency parking zones, the widths of lanes, the gradients of roads, the positions of roads (three-dimensional coordinates including longitude, latitude and height), the curvatures of curves of lanes, the positions of merge or branch points of lanes, signs installed on roads, or the like. The second map information 62 may be updated as needed by accessing another device using the communication device 20.

The vehicle sensors 70 include a vehicle speed sensor that detects the speed of the vehicle M at the current time, an acceleration sensor that detects an acceleration of the vehicle M relating to the travel direction thereof, a yaw rate sensor that detects an angular speed thereof about the vertical axis, an orientation sensor that detects the orientation of the vehicle M, or the like. The acceleration includes, for example, at least one of longitudinal acceleration relating to a travel direction of the vehicle M or lateral acceleration relating to a lateral direction of the vehicle M.

The driving operators 80 include, for example, an accelerator pedal, a brake pedal, a shift lever, a steering wheel, and other operators. A sensor for detecting the amount of operation or the presence or absence of operation is attached to each of the driving operators 80 and detection results thereof are output to either or both of the automated driving control unit 100 or the travel driving force output, brake, and steering devices 200, 210, and 220.

The vehicle interior camera 90 captures, for example, the inside of the vehicle M. For example, the vehicle interior camera 90 captures the seat device 300 or the surroundings of the seat device 300. For example, the vehicle interior camera 90 captures an image of the inside of the vehicle M at regular intervals. The captured image of the vehicle interior camera 90 is output to the automated driving control unit 100.

[Automated Driving Control Unit]

The automated driving control unit 100 includes, for example, a first control unit 120, a second control unit 140, an interface control unit 150, a seat state acquisition unit 160, a vehicle state acquisition unit 170, and a seat control unit 180. Each of the first control unit 120, the second control unit 140, the interface control unit 150, the seat state acquisition unit 160, the vehicle state acquisition unit 170, and the seat control unit 180 is realized by a processor such as a central processing unit (CPU) executing a program (software). Some or all of the respective functional units of the first control unit 120, the second control unit 140, the interface control unit 150, the seat state acquisition unit 160, the vehicle state acquisition unit 170, and the seat control unit 180 which will be described below may be realized by hardware such as a large scale integration (LSI), an application specific integrated circuit (ASIC), or a field-programmable gate array (FPGA) or may be realized by cooperation of hardware and software. The program may be stored in a storage device such as a hard disk drive (HDD) or a flash memory in advance or may be stored in a detachable and a non-transitory computer-readable storage medium such as a DVD or a CD-ROM and then installed on the storage device by inserting the storage medium into a drive device.

The first control unit 120 includes, for example, an external environment recognition unit 121, an own-vehicle position recognition unit 122, and a behavior plan generation unit 123.

The external environment recognition unit 121 recognizes states of a nearby vehicle(s) such as the position, speed and acceleration thereof on the basis of information input from the camera 10, the radar device 12, and the finder 14 via the object recognition device 16. The position of the nearby vehicle may be represented by a representative point such as a center of gravity or a corner of the nearby vehicle or may be represented by a region expressed by a contour of the nearby vehicle. The "states" of the nearby vehicle may include an acceleration or jerk of the nearby vehicle or a "behavior state" (for example, whether or not the nearby vehicle is changing or is going to change lanes).

The external environment recognition unit 121 may also recognize the positions of guardrails or utility poles, parked vehicles, people such as pedestrians, and other objects in addition to nearby vehicles.

The own-vehicle position recognition unit 122 recognizes, for example, a (traveling) lane in which the vehicle M is traveling and the relative position and attitude of the vehicle M with respect to the traveling lane. The own-vehicle position recognition unit 122 recognizes the traveling lane, for example, by comparing a pattern of road lane lines (for example, an arrangement of solid and broken lines) obtained from the second map information 62 with a pattern of road lane lines near the vehicle M recognized from an image captured by the camera 10. This recognition may be performed taking into consideration a position of the vehicle M acquired from the navigation device 50 or a result of processing by the INS.

Figure 2:
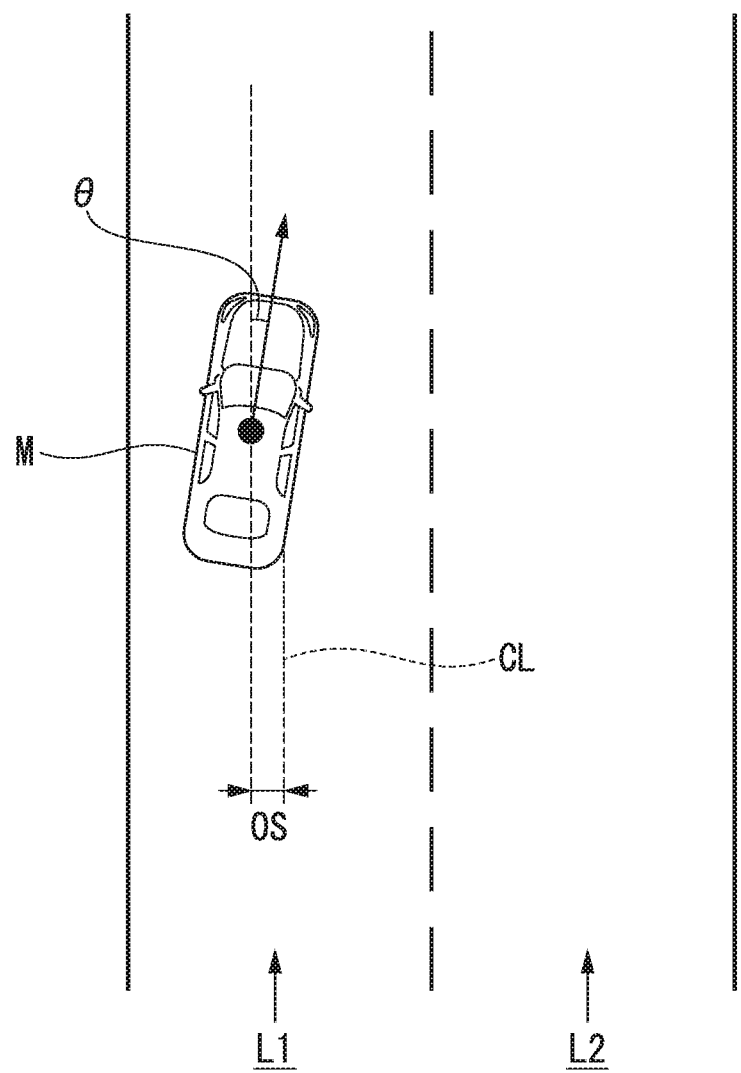
FIG. 2 is a diagram showing how the relative position and attitude of a vehicle with respect to a traveling lane are recognized by an own-vehicle position recognition unit 122.

Then, the own-vehicle position recognition unit 122 recognizes, for example, the relative position or attitude of the vehicle M with respect to the traveling lane. FIG. 2 is a diagram showing how the relative position and attitude of the vehicle M with respect to the traveling lane L1 are recognized by the own-vehicle position recognition unit 122. For example, the own-vehicle position recognition unit 122 recognizes both a deviation OS from a traveling lane center CL of a reference point (for example, the center of gravity) of the vehicle M and an angle θ formed by the travel direction of the vehicle M relative to an extension line of the traveling lane center CL as the relative position and attitude of the vehicle M with respect to the traveling lane L1. Alternatively, the own-vehicle position recognition unit 122 may recognize, for example, the position of the reference point of the vehicle M with respect to one of the sides of the traveling lane L1 or the like as the relative position of the vehicle M with respect to the traveling lane. The relative position of the vehicle M recognized by the own-vehicle position recognition unit 122 is provided to the recommended lane determination unit 61 and the behavior plan generation unit 123.

The behavior plan generation unit 123 generates a behavior plan for the vehicle M to perform automated driving to the destination or the like. For example, the behavior plan generation unit 123 determines events which are to be sequentially performed in the automated driving control such that the vehicle M travels in the recommended lane determined by the recommended lane determination unit 61 and copes with situations occurring near the vehicle M. Events in the automated driving of the first embodiment include, for example, a constant-speed travel event which is an event of traveling in the same traveling lane at a constant speed, a lane change event which is an event of changing the traveling lane of the vehicle M, an overtaking event which is an event of overtaking a preceding vehicle, a following travel event which is an event of traveling behind a preceding vehicle, a merging event which is an event of causing the vehicle to merge at a merge point, a branching event which is an event of causing the vehicle M to travel in a target direction at a branch point of the road, an emergency stop event which is an event of causing the vehicle M to make an emergency stop, and a handover event which is an event of terminating automated driving and switching to manual driving. During execution of these events, behaviors for avoidance may sometimes be planned on the basis of situations occurring near the vehicle M (such as the presence of nearby vehicles and pedestrians or lane narrowing due to road construction).

The behavior plan generation unit 123 generates a target trajectory along which the vehicle M will travel in the future. The target trajectory includes, for example, velocity components. For example, the target trajectory is generated as a set of target points (trajectory points) to be reached at a plurality of future reference times which are set at intervals of a predetermined sampling time (for example, about tenths of a second). Therefore, in a case that the distance between trajectory points is great, this means that the vehicle travels at a high speed in the section between the trajectory points.

Figure 3:
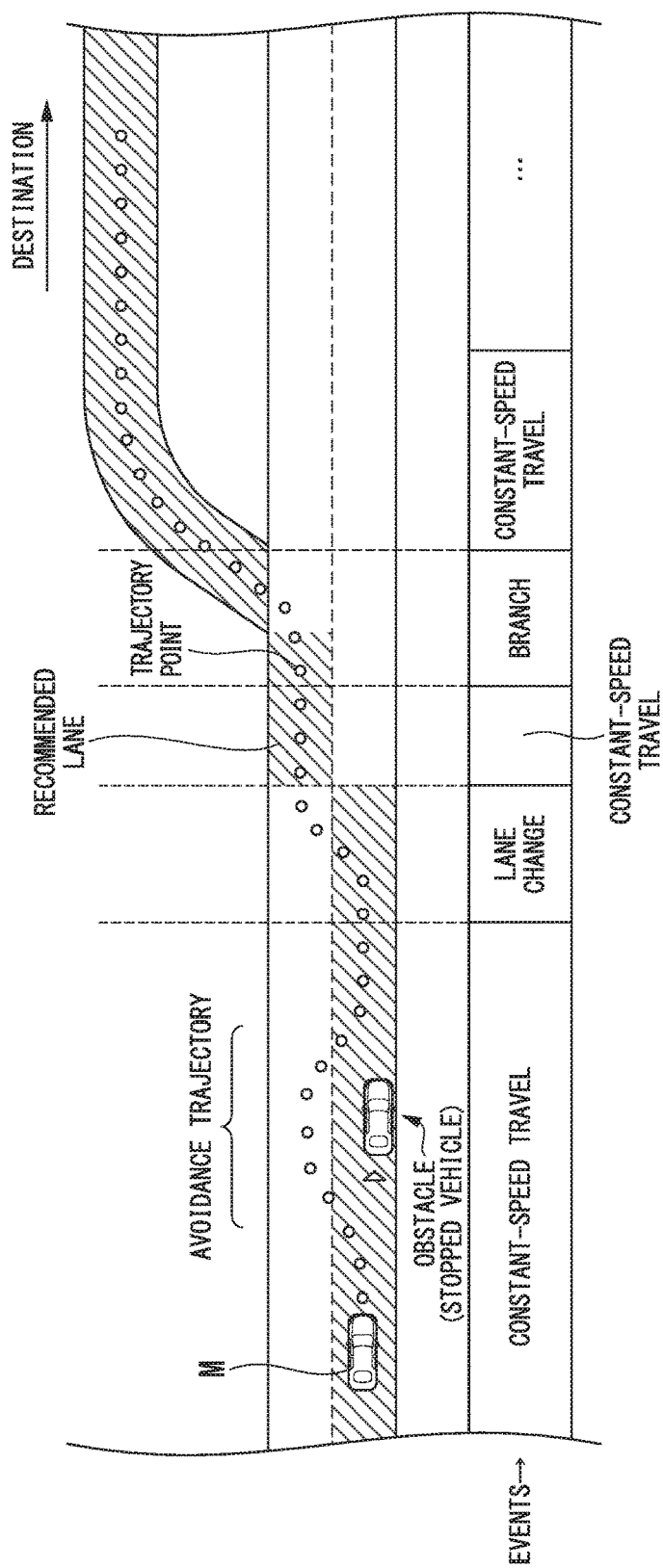
FIG. 3 is a diagram showing how a target trajectory is generated on the basis of a recommended lane.

FIG. 3 is a diagram showing how a target trajectory is generated on the basis of a recommended lane. As shown, the recommended lane is set to be convenient for traveling along the route to the destination. When the vehicle M approaches a predetermined distance (which may be determined according to the types of events) before a point for switching to the recommended lane, the behavior plan generation unit 123 activates a lane change event, a branching event, a merging event, or the like. In a case that it becomes necessary to avoid an obstacle during execution of each event, an avoidance trajectory is generated as shown in FIG. 3.

For example, the behavior plan generation unit 123 generates a plurality of candidate target trajectories and selects an optimum target trajectory that is suitable for the route to the destination at that point in view of safety and efficiency.

The second control unit 140 includes, for example, a travel control unit 141 and a switching control unit 142. The travel control unit 141 controls the travel driving force output device 200, the brake device 210, and the steering device 220 such that the vehicle M passes along the target trajectory generated by the behavior plan generation unit 123 at scheduled times.

The switching control unit 142 switches the driving mode of the vehicle M on the basis of the behavior plan generated by the behavior plan generation unit 123. For example, the switching control unit 142 switches the driving mode from manual driving to automated driving at a planned start point of the automated driving. The switching control unit 142 switches the driving mode from automated driving to manual driving at a planned end point of the automated driving.

The switching control unit 142 may switch between automated driving and manual driving, for example, on the basis of a switching signal input through an automated driving changeover switch included in the HMI 30. The switching control unit 142 may also switch the driving mode of the vehicle M from automated driving to manual driving, for example, on the basis of an operation performed on a driving operator 80 such as the accelerator pedal, the brake pedal, or the steering wheel to instruct that acceleration, deceleration, or steering be performed.

During manual driving, input information from the driving operators 80 is output to the travel driving force output device 200, the brake device 210, and the steering device 220. Input information from the driving operators 80 may also be output to the travel driving force output device 200, the brake device 210, and the steering device 220 via the automated driving control unit 100. Respective electronic control units (ECUs) of the travel driving force output device 200, the brake device 210, and the steering device 220 perform their operations on the basis of the input information from the driving operators 80 or the like.

The interface control unit 150 causes the HMI 30 to output a traveling state of the vehicle M during automated driving or manual driving, the timing of switching between automated driving and manual driving, a notification regarding a request for the occupant to perform manual driving or the like, etc. The interface control unit 150 may cause the HMI 30 to output information regarding control by the seat control unit 180. The interface control unit 150 may also output information received by the HMI 30 to the first control unit 120 or the seat control unit 180.

The seat state acquisition unit 160 acquires, for example, information regarding the rotation angle about the vertical axis of the seat device 300. For example, the seat state acquisition unit 160 acquires information regarding the rotation angle about the vertical axis of each seat device 300 provided in the vehicle M through a seat position detection unit 370 which will be described later. The seat state acquisition unit 160 may acquire information regarding in which direction the seat device 300 is oriented among forward, lateral, or backward directions with respect to the travel direction. The travel direction may be the direction of the velocity vector at that moment or may be the direction of the central axis of the vehicle M. The forward direction is the orientation of the seat device 300 where the occupant sitting on the seat device 300 faces in the travel direction. The lateral direction is the orientation of the seat device 300 where the occupant sitting on the seat device 300 faces in a direction crossing (for example, orthogonal to) the travel direction. The backward direction is the orientation of the seat device 300 where the occupant sitting on the seat device 300 faces in the direction opposite to the travel direction. However, the forward direction may include not only a direction exactly matching the travel direction of the vehicle M but also a direction within a predetermined range with respect to (for example, centered on) the travel direction of the vehicle M. The lateral direction may include not only a direction exactly matching the direction orthogonal to the travel direction of the vehicle M but also a direction within a predetermined range with respect to (for example, centered on) the direction orthogonal to the travel direction of the vehicle M. The backward direction may include not only a direction exactly matching the direction opposite to the travel direction of the vehicle M but also a direction within a predetermined range with respect to (for example, centered on) the direction opposite to the travel direction of the vehicle M. The predetermined range is, for example, a range from minus a predetermined angle to plus the predetermined angle. The predetermined angle is, for example, 45 degrees.

For example, the vehicle state acquisition unit 170 acquires the current or future acceleration relating to the vehicle M. The vehicle state acquisition unit 170 acquires the current acceleration from the vehicle sensors 70. For example, the vehicle state acquisition unit 170 acquires a future acceleration which will act on the vehicle M on the basis of a target trajectory, along which the vehicle M will travel in the future, generated by the behavior plan generation unit 123. The vehicle state acquisition unit 170 acquires a lateral acceleration due to a curve from trajectory points of a target trajectory. For example, the vehicle state acquisition unit 170 may predict a longitudinal acceleration in an emergency stop to avoid collision with an obstacle in front.

The vehicle state acquisition unit 170 may acquire the current or future acceleration on the basis of road information obtained from the navigation device 50, the current steering angle of the vehicle M obtained from a driving operator 80, the current speed of the vehicle M obtained from the vehicle sensors 70, or the like.

The seat control unit 180 controls the seat device 300 on the basis of the rotation angle of the seat device 300 acquired by the seat state acquisition unit 160 and the current or future acceleration of the vehicle M acquired by the vehicle state acquisition unit 170. Details of the functions of the seat control unit 180 will be described later.

The travel driving force output device 200 outputs a travel driving force (torque) required for the vehicle M to travel to driving wheels. The travel driving force output device 200 includes, for example, a combination of an internal combustion engine, an electric motor, a transmission, and the like and an ECU that controls them. The ECU controls the above constituent elements according to information input from the travel control unit 141 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the travel control unit 141 or information input from the driving operators 80 such that a brake torque in response to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the travel control unit 141 or information input from the driving operators 80 and transmits the hydraulic pressure of the master cylinder to the cylinder. The brake device 210 may also include a plurality of brake systems in consideration of safety.

The steering device 220 includes, for example, a steering ECU and an electric motor. The electric motor, for example, applies a force to a rack-and-pinion mechanism to change the direction of steering wheels. The steering ECU drives the electric motor according to information input from the travel control unit 141 or information input from the driving operators 80 to change the direction of the steering wheels.

The seat device 300 is an electrically drivable seat on which an occupant of the vehicle M sits. The seat device 300 includes a driver's seat provided with the driving operators 80, a front occupant seat, rear seats, or the like.

[Configuration and Control of Seat Device 300]

Hereinafter, the configuration of the seat device 300 of the first embodiment and control of the seat device 300 by the seat control unit 180 will be described in detail. The following example will be described with reference to control of the seat device 300 during automated driving during which acceleration/deceleration and steering of the vehicle M are automatically controlled to cause the vehicle to travel.

Figure 4:
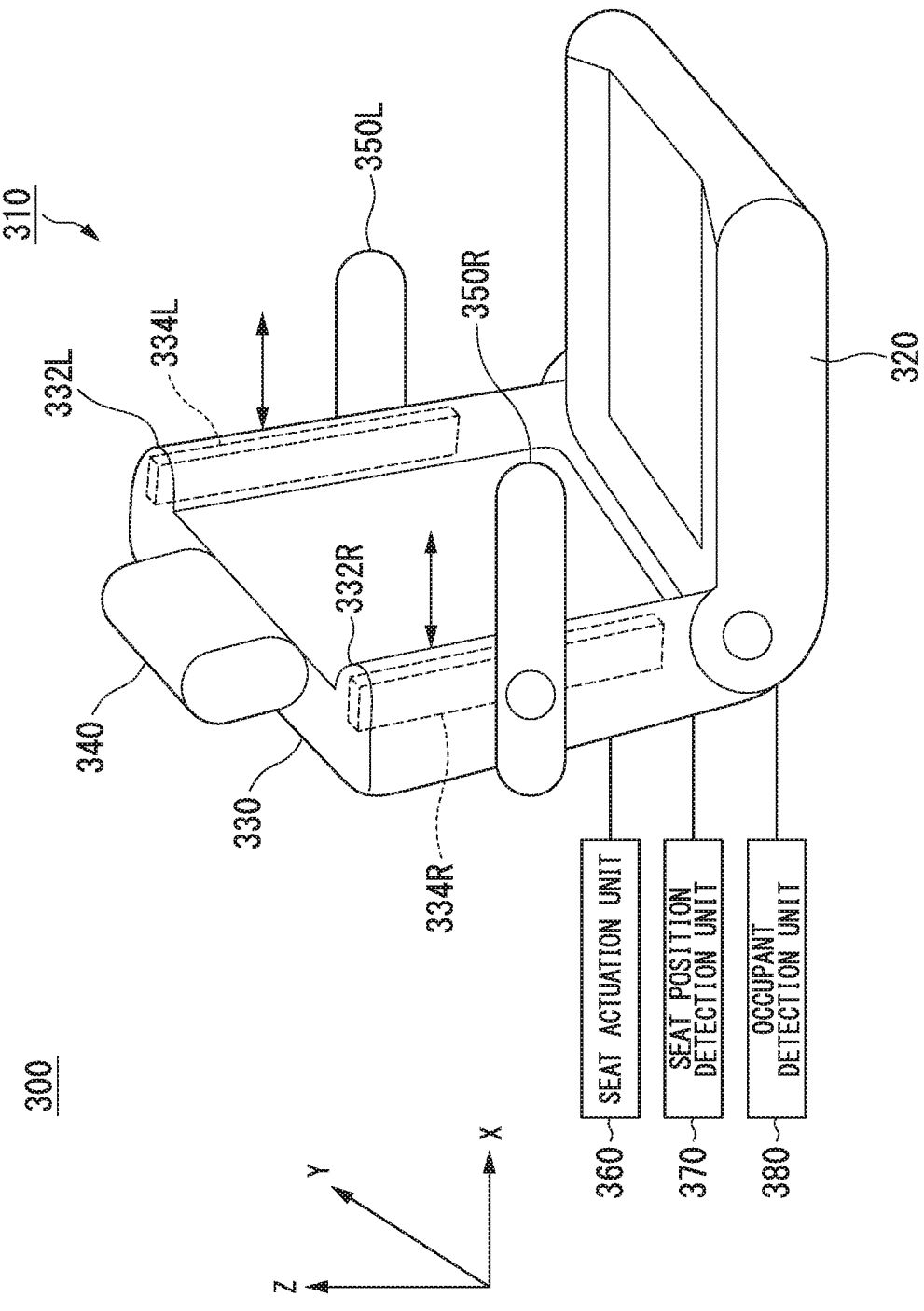
FIG. 4 is a view showing a seat device of the first embodiment.

In the following description, the acceleration may be any of the current acceleration or the future acceleration. FIG. 4 is a view showing the seat device of the first embodiment. The seat device 300 includes, for example, a seat (seat main body) 310, a seat actuation unit 360, a seat position detection unit 370, and an occupant detection unit 380.

The seat 310 includes, for example, a sitting portion 320, a backrest portion (a seat back) 330, a headrest 340, and armrests 350. The sitting portion 320 supports the occupant from below.

The backrest portion 330 supports the back of an occupant sitting on the sitting portion 320. The backrest portion 330 includes, for example, a plurality of side support portions 332R and 332L that support the occupant sitting on the seat 310 from different directions. The side support portions 332R and 332L include protruding mechanisms 334R and 334L for adjusting the position and displacement of the side support portions 332R and 332L, respectively. The protruding mechanisms 334R and 334L are, for example, plate-like members capable of moving by a predetermined amount in the X direction. In this case, the seat control unit 180 controls driving of a motor (not shown) to move the protruding mechanisms 334R and 334L. Instead of the plate-like members, bag-like members that are inflated in the X direction by storing a gas or liquid inside may be used for the protruding mechanisms 334R and 334L. In this case, the seat control unit 180 controls driving of a pump and valves connected to injection discharge pipes (not shown) communicating with the bag-like members to inject a gas or a liquid into the bag-like members, thereby inflating the bag-like members. The seat control unit 180 controls each of the protruding mechanisms 334R and 334L to deform at least a part of a corresponding one of the side support portions 332R and 332L.

The headrest 340 supports the head or neck of the occupant sitting on the sitting portion 320. The armrests 350 support the arms of the occupant. The armrests 350 are connected to the left and right side surfaces of the backrest portion 330.

The seat actuation unit 360, for example, moves the position of at least one of the protruding mechanisms 334R and 334L on the basis of an instruction from the seat control unit 180. The seat actuation unit 360 changes at least one of the reclining angle, the forward-backward position, the lateral position, the vertical position, or the like of the seat 310 on the basis of an instruction from the seat control unit 180.

The seat position detection unit 370 detects, for example, the rotation angle about the vertical axis (Z axis) of the seat 310 on which the occupant sits. The term "vertical axis" as used herein refers to an imaginary axis through the vehicle M in a state in which the vehicle M is stationary on a horizontal plane.

The seat position detection unit 370 detects, for example, the positions of the protruding mechanisms 334R and 334L. The seat position detection unit 370 may detect which direction the seat 310 is oriented among forward, lateral, or backward. In this case, it is assumed that the seat 310 is fixed only at intervals of 90 degrees as a precondition.

The seat position detection unit 370 may detect the reclining angle of the seat 310 and forward-backward, lateral, and vertical displacements of the seat 310 from their reference positions. The seat position detection unit 370 outputs the detection result to the seat control unit 180.

The occupant detection unit 380 detects the occupant's sitting on the seat 310. For example, in a case that a load detected by one or more load sensors provided in the sitting portion 320 and the backrest portion 330 is equal to or greater than a threshold value, the occupant detection unit 380 detects that the occupant is sitting on the seat 310. The occupant detection unit 380 may analyze an image captured by the vehicle interior camera 90 to determine whether or not an object present on the sitting portion 320 is a person and may then detect that an occupant is sitting on the sitting portion 320 upon determining that the object present on the sitting portion 320 is a person.

Figure 5:
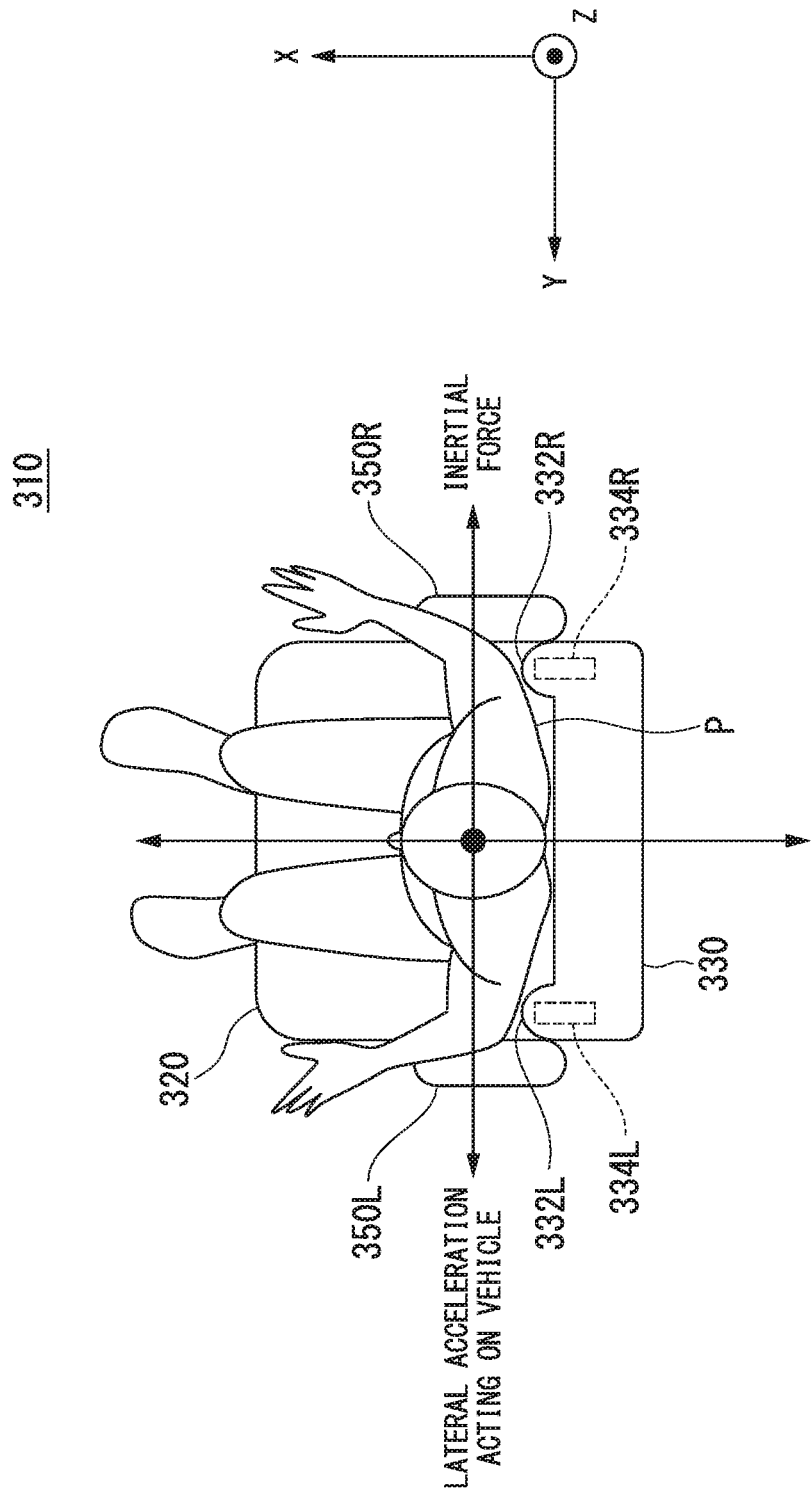
FIG. 5 is a view of a seat as viewed from above the vehicle.

Next, the operation of the seat 310 of the first embodiment will be described. FIG. 5 is a view of the seat 310 as viewed from above the vehicle M. For example, in a case that the vehicle M accelerates in the travel direction (X direction), longitudinal acceleration acts on the vehicle M in the travel direction of the vehicle M. Accordingly, an inertial force is applied to the occupant P in a direction opposite to the travel direction of the vehicle M. At this time, the posture of the occupant P is supported, for example, by the backrest portion 330. In a case that the vehicle M decelerates, acceleration acts on the vehicle M in a direction opposite to the travel direction of the vehicle M. Accordingly, an inertial force is applied to the occupant P in the travel direction of the vehicle M. At this time, the posture of the occupant P is supported, for example, by a seat belt (not shown).

In a case that the vehicle M travels on a curved road that turns to the left with respect to the travel direction (X direction), lateral acceleration acts on the vehicle M to the left with respect to the travel direction of the vehicle M as shown in FIG. 5. Accordingly, an inertial force is applied to the occupant P to the right with respect to the travel direction of the vehicle M. Here, in a case that the orientation of the seat 310 is forward with respect to the travel direction of the vehicle M, the posture of the occupant P is supported, for example, by the right side support portion 332R and the right side armrest 350R of the seat 310.

FIG. 6 is a view showing the operation of the seat 310 in a case that the seat device 300 is forward. In an example of FIG. 6, the orientation of the seat 310 is rotated to the right by an angle θ2 about the vertical axis with respect to the travel direction of the vehicle M. The angle θ2 is included in a forward-oriented range. In this state, it is assumed that the vehicle M travels on a left curved road such that an inertial force is applied to the right with respect to the travel direction of the vehicle M. In this case, an inertial force is applied to an occupant P diagonally forward to the right and the occupant P cannot be sufficiently supported at the positions of the right side support portion 332R and the right side armrest 350R of the seat 310 at the current state. Therefore, in a case that the seat 310 is oriented forward and the lateral acceleration of the vehicle M obtained from the vehicle state acquisition unit 170 is equal to or greater than a first threshold value, the seat control unit 180 controls driving of a motor (not shown) such that the protruding mechanism 334R on the right side of the seat 310, which is located on the side opposite to the direction in which a lateral acceleration acts on the vehicle M, is moved in a direction to support the body of the occupant (i.e., forward of the seat 310). Thus, the seat 310 can support the body of the occupant P and can restrain the body of the occupant from moving to the right due to the inertial force.

Hereinafter, the amount of deformation of the side support portion 332R or 332L in a case that a lateral acceleration acts on the vehicle M in the case in which the orientation of the seat 310 is forward is referred to as a "first deformation amount."

Figure 7:
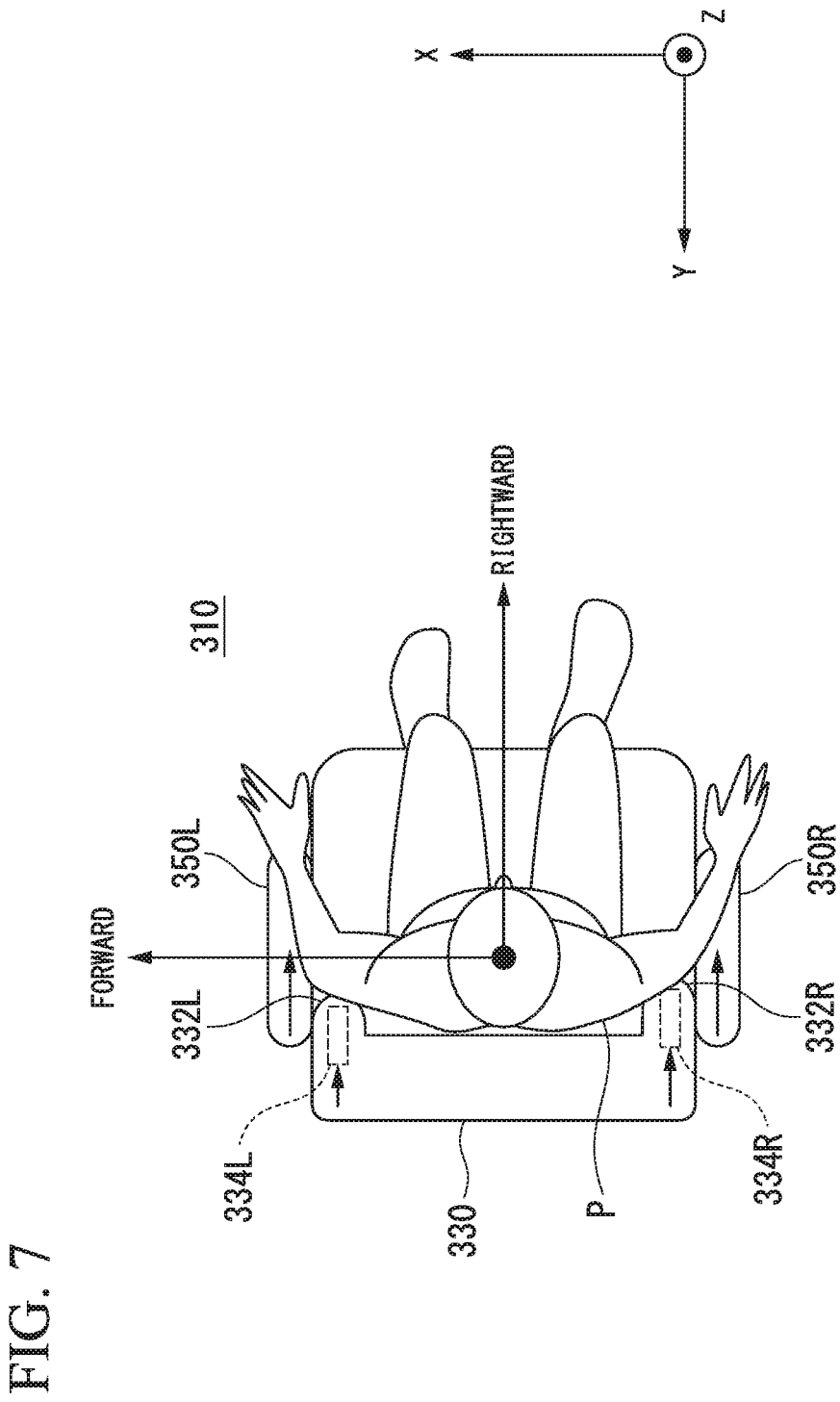
FIG. 7 is a view showing the operation of the seat in a case that the orientation of the seat device is lateral.

FIG. 7 is a view showing the operation of the seat 310 in a case that the orientation of the seat device 300 is lateral.

The seat control unit 180 controls deformation control of the side support portions 332R and 332L in a case that the orientation of the seat 310 is lateral and the longitudinal acceleration of the vehicle M obtained from the vehicle state acquisition unit 170 is equal to or greater than a second threshold value. In this case, the seat control unit 180 controls the protruding mechanisms 334R and 334L on the right and left sides of the seat 310 to cause the side support portions 332R and 332L to protrude.

At this time, the seat control unit 180 makes the amount of deformation of the side support portions 332R and 332L greater than the first deformation amount. Hereinafter, the amount of deformation of the side support portion 332R or 332L in a case that a longitudinal acceleration acts on the vehicle M in the case in which the orientation of the seat 310 is lateral is referred to as a "second deformation amount."

Thus, for example, even in a case that a great longitudinal acceleration acts on the vehicle M as the vehicle M performs sudden start, sudden stop, sudden acceleration, sudden deceleration, or the like, the seat 310 can support the occupant P by the side support portions 332R and 332L.

For example, in a case that the seat 310 is oriented laterally and the longitudinal acceleration of the vehicle M obtained from the vehicle state acquisition unit 170 is equal to or greater than a third threshold value, the seat control unit 180 actuates the armrests in addition to the side supports. The third threshold value is, for example, a value greater than the second threshold value. In this case, in addition to causing the side support portions 332R and 332L to protrude, the seat control unit 180 moves the armrests 350R and 350L in a direction to support the body of the occupant P (i.e., forward of the seat 310).

Thus, the seat 310 can support the body of the occupant in a greater amount than in a case that supporting the body of the occupant only by the side support portions 332R and 332L. Accordingly, the seat 310 can more securely support the body of the occupant against acceleration acting on the vehicle M.

Figure 8:
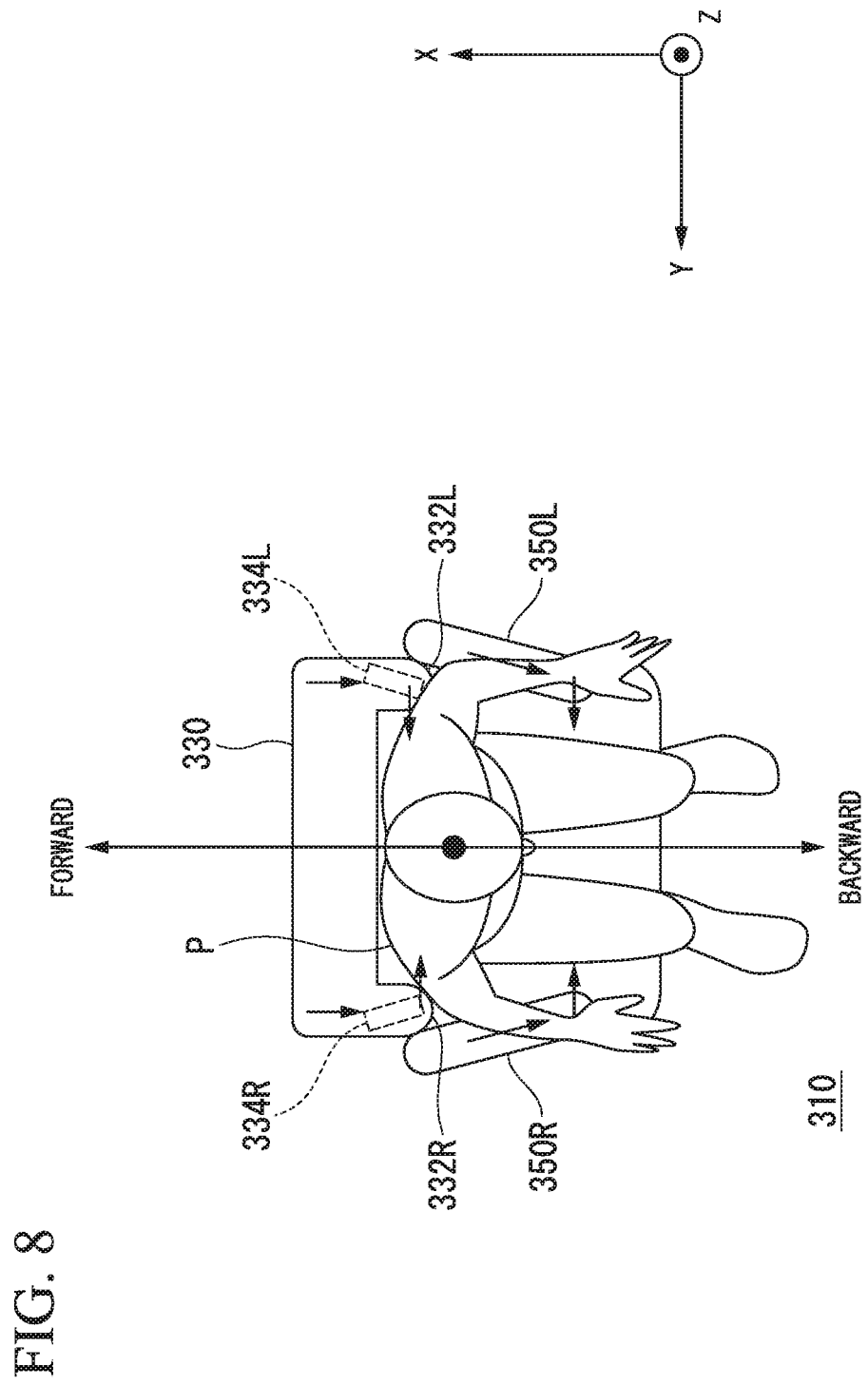
FIG. 8 is a view showing the operation of the seat in a case that the orientation of the seat device is backward.

FIG. 8 is a view showing the operation of the seat 310 in a case that the orientation of the seat device 300 is backward. The seat control unit 180 performs deformation control of the side support portions 332R and 332L in a case that the seat 310 is oriented backward and the lateral acceleration of the vehicle M obtained from the vehicle state acquisition unit 170 is equal to or greater than a fourth threshold value.

The seat control unit 180 performs deformation control of the side support portions 332R and 332L in a case that the orientation of the seat device 300 is backward such that the amount of deformation of the side support portions 332R and 332L in a case that the orientation of the seat 310 is backward and lateral acceleration acts on the vehicle M is greater than the first deformation amount. Hereinafter, the amount of deformation of the side support portion 332R or 332L in a case that a lateral acceleration acts on the vehicle M with the seat 310 oriented backward is referred to as a "third deformation amount." The seat control unit 180 sets the third deformation amount to be greater than the second deformation amount. Thus, the seat control unit 180 can more securely support the body of the occupant even in a case that a longitudinal acceleration acts with the seat 310 oriented backward.

As shown in FIG. 8, the seat control unit 180 may tilt the side support portions 332R and 332L toward the occupant. The seat control unit 180 may also tilt the armrests 350R and 350L toward the occupant in a case that the seat 310 is oriented backward and the lateral acceleration of the vehicle M obtained from the vehicle state acquisition unit 170 is equal to or greater than the fourth threshold value. Thus, the seat 310 not only can support the body of the occupant against lateral acceleration of the occupant but can also more securely support the body of the occupant even in a case that a longitudinal acceleration such as sudden acceleration or sudden start acts on the vehicle M in the travel direction.

[Process Flow]

Figure 9:
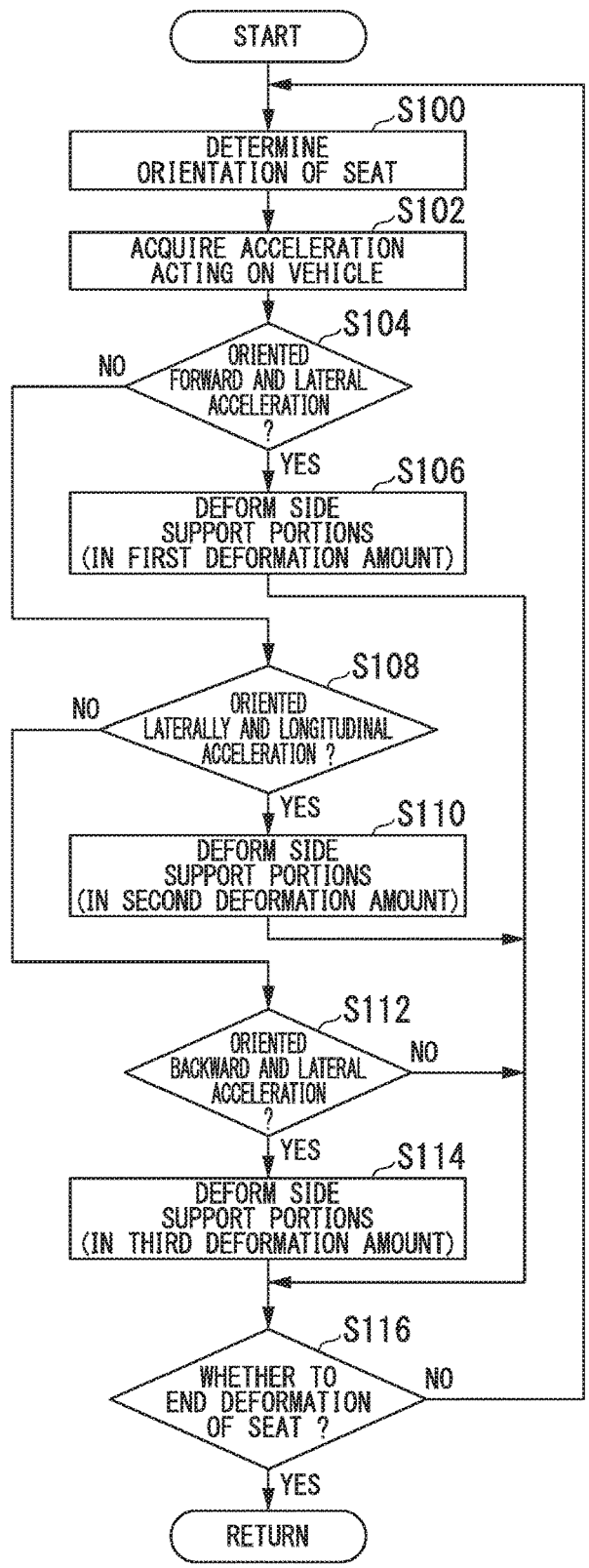
FIG. 9 is a flowchart showing a flow of seat control of the first embodiment.

Hereinafter, a flow of seat control of the first embodiment will be described. FIG. 9 is a flowchart showing a flow of seat control of the first embodiment. In an example of FIG. 9, the seat state acquisition unit 160 determines the orientation of the seat 310 on the basis of a seat position obtained by the seat position detection unit 370 (step S100). Next, the vehicle state acquisition unit 170 acquires acceleration acting on the vehicle M (step S102). Next, the seat control unit 180 determines whether or not the orientation of the seat 310 is forward and lateral acceleration is equal to or greater than the first threshold value (step S104). Determining that the orientation of the seat 310 is forward and the lateral acceleration is equal to or greater than the first threshold value, the seat control unit 180 deforms the side support portions 332 in the first deformation amount (step S106).

Upon determining in the process of step S104 that the orientation of the seat 310 is not forward or the lateral acceleration is not equal to or greater than the first threshold value, the seat control unit 180 determines whether or not the orientation of the seat 310 is lateral and longitudinal acceleration is equal to or greater than the second threshold value (step S108). Upon determining that the orientation of the seat 310 is lateral and the longitudinal acceleration is equal to or greater than the second threshold value, the seat control unit 180 deforms the side support portions 332 in the second deformation amount (step S110).

Upon determining in step S108 that the orientation of the seat 310 is not lateral or the longitudinal acceleration is not equal to or greater than the second threshold value, the seat control unit 180 determines whether or not the orientation of the seat 310 is backward and lateral acceleration is equal to or greater than the fourth threshold value (step S112). Determining that the orientation of the seat 310 is backward and the lateral acceleration is equal to or greater than the fourth threshold value, the seat control unit 180 deforms the side support portions 332 in the third deformation amount (step S114).

Upon determining in the process of step S112 that the orientation of the seat 310 is not backward or the lateral acceleration is not equal to or greater than the fourth threshold value, the seat control unit 180 determines whether or not an instruction to end the deformation of the seat 310 according to the first embodiment has been received from the HMI 30, the first control unit 120, or the second control unit 140 (step S116). Upon determining that an instruction to end the deformation of the seat 310 has not been received, the seat control unit 180 returns to the process of step S100. Upon determining that an instruction to end the deformation of the seat 310 has been received, the seat control unit 180 ends the process of this flowchart.

According to the first embodiment described above, it is possible to realize seat forms more suitable for changes in the orientation of the seat 310 or the state of the vehicle. Even in a case that the seat 310 is rotated about the vertical axis, the occupant can be supported by the seat 310 and thus can be kept comfortable during traveling.

Second Embodiment

Next, a seat device of a second embodiment will be described. In the following, configurations and operations relating to armrests will mainly be described and it is assumed that the other configurations are common to the first embodiment.

Figure 10:
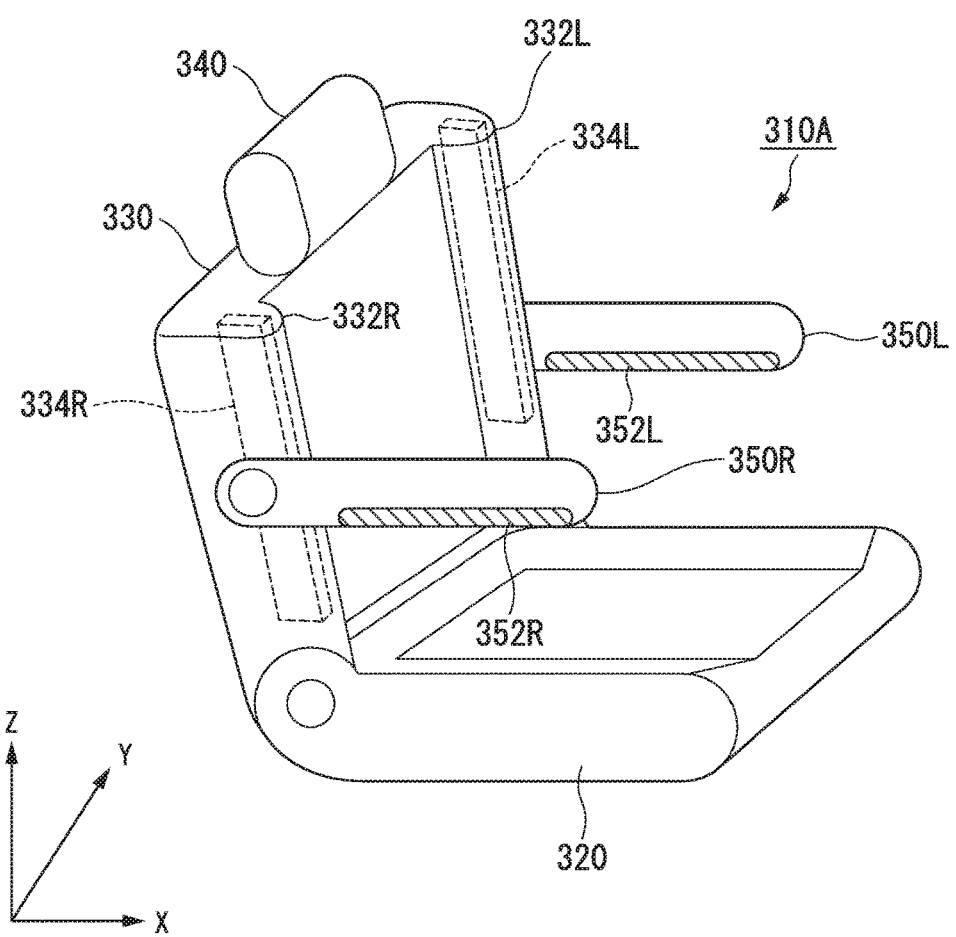
FIG. 10 is a view showing the operation of a seat of a second embodiment.

FIG. 10 is a view showing the operation of the seat 310A of the second embodiment. The seat 310A of the second embodiment includes bag-like members 352R and 352L under the armrests 350R and 350L in addition to the mechanisms for causing the side support portions 332 to protrude. The bag-like members 352R and 352L store a gas or liquid and are inflated downward from the armrests 350R and 350L according to the amount of the stored gas or liquid. The bag-like members 352R and 352L are formed of, for example, an elastic body or a folded cloth-like substance. The material of the bag-like members 352R and 352L is rubber in a case that they are formed of an elastic body and is synthetic resin in a case that they are formed of a folded cloth-like substance. The gas is, for example, air. The liquid is, for example, water. Injection or discharge of a liquid or gas into and from the bag-like members 352R and 352L is performed, for example, by a pump connected to injection discharge pipes (not shown) communicating with the bag-like members 352R and 352L.

For example, in a case that the seat 310A is oriented laterally and the longitudinal acceleration of the vehicle M obtained from the vehicle state acquisition unit 170 is equal to or greater than the second threshold value, the seat control unit 180 deforms the armrests 350R and 350L in addition to deforming the side support portions 332R and 332L. In this case, in addition to deforming the side support portions 332R and 332L, for example, the seat control unit 180 opens valves communicating with the injection discharge pipes and controls driving of the pump to inject a gas or liquid into the bag-like members 352R and 352L such that the bag-like members 352R and 352L are expanded downward from the armrests 350R and 350L.

In the second embodiment, the seat control unit 180 may cause the bag-like members 352R and 352L to be expanded after moving the armrests 350R and 350L in a direction to support the body of the occupant (i.e., forward of the seat 310A).

Figure 11:
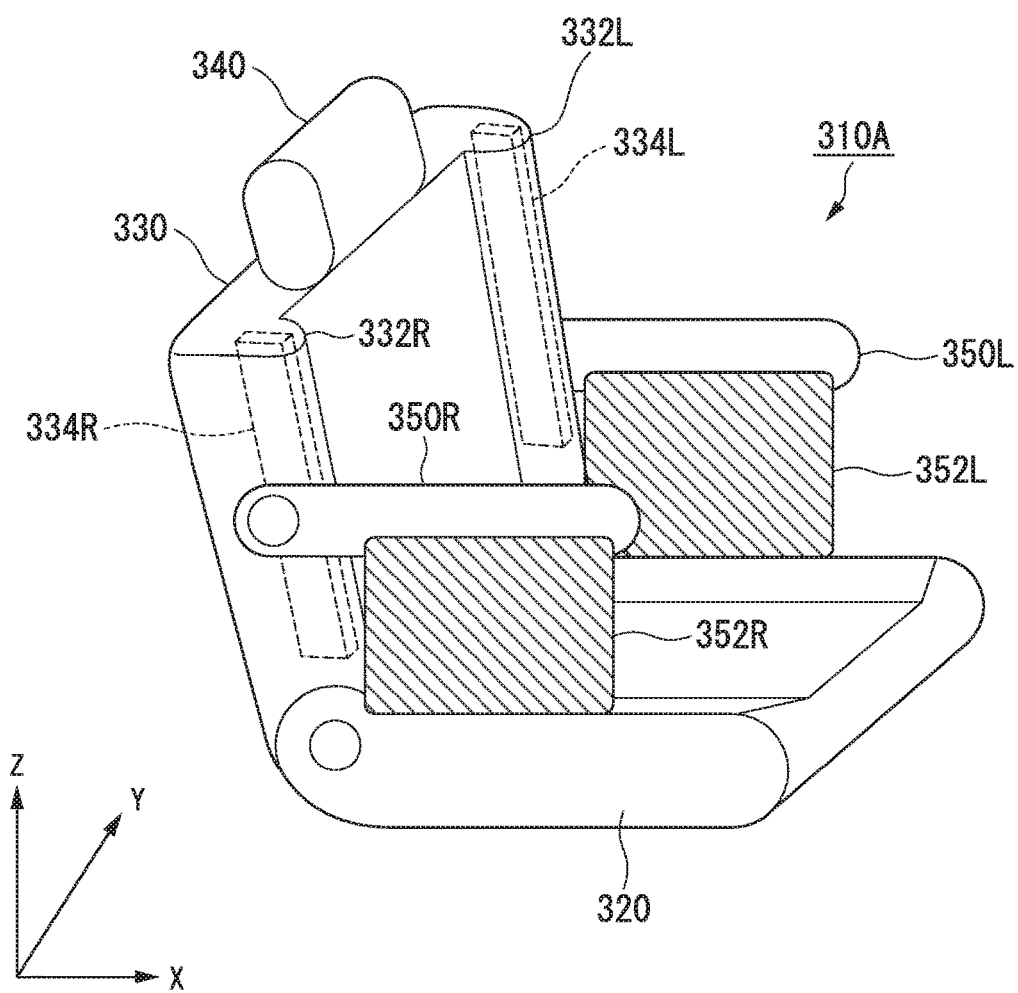
FIG. 11 is a view showing an example in which a gas or liquid is injected into bag-like members.

FIG. 11 is a view showing an example in which a gas or liquid are injected into the bag-like members 352R and 352L. For example, the seat control unit 180 opens the valves such that a gas or liquid is injected into the bag-like members 352R and 352L by the pump, thereby expanding the bag-like members 352R and 352L. The seat control unit 180 closes the valves with the bag-like members 352R and 352L expanded, such that the bag-like members 352R and 352L expanded downward from the armrests 350R and 350L are integrated with the armrests 350R and 350L to form a shape supporting the occupant.

For example, in a case that the seat 310A does not satisfy a condition for expanding the bag-like members 352R and 352L, for example, in a case that the seat 310A is oriented forward, the seat control unit 180 opens the valves communicating with the injection discharge pipes and controls driving of the pump to discharge the gas or liquid stored in the bag-like members 352R and 352L and returns the bag-like members 352R and 352L to their original state.

In the second embodiment, protruding mechanisms that can protrude downward by a mechanical operation may be provided instead of the bag-like members 352R and 352L. In a case that deforming the armrests 350R and 350L, the seat control unit 180 controls driving of a motor to perform control to move the protruding mechanisms downward or to return the protruding mechanisms to their original state.

[Process Flow]

Figure 12:
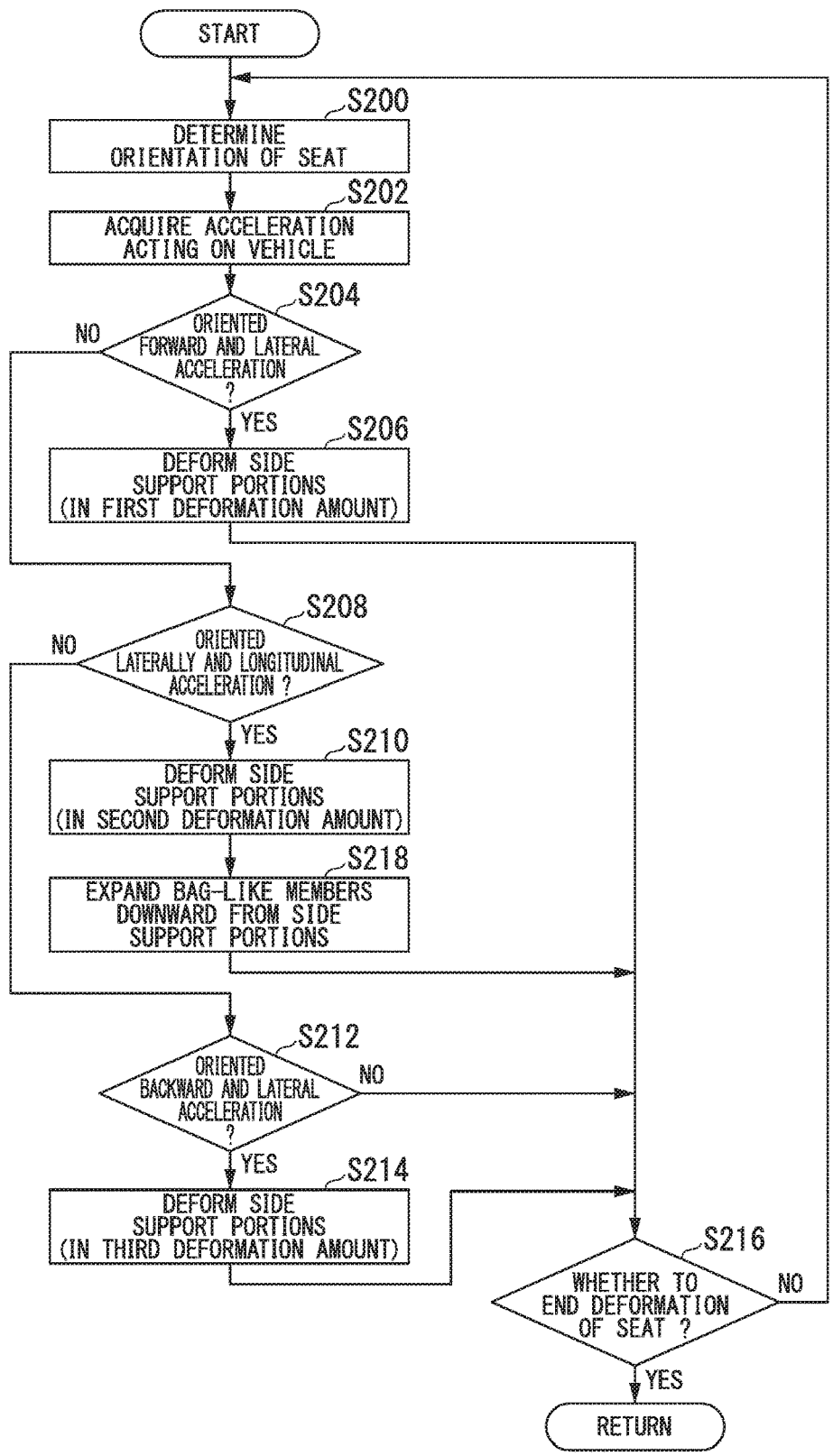
FIG. 12 is a flowchart showing a flow of seat control of the second embodiment.

A flow of seat control of the second embodiment will be described below. FIG. 12 is a flowchart showing a flow of seat control of the second embodiment. Steps S200 to S216 shown in FIG. 12 are similar to steps S100 to S116 shown in FIG. 9 described above and thus detailed descriptions thereof will be omitted.

Upon determining in the process of step S210 of FIG. 12 that the orientation of the seat 310A is lateral and the longitudinal acceleration is equal to or greater than the second threshold value, the seat control unit 180 deforms the side support portions 332 in the second deformation amount greater than the first deformation amount (step S210). Further, in addition to deforming the side support portions 332, the seat control unit 180 expands the bag-like member 352 downward from the side support portions 332 (step S218).

According to the second embodiment described above, portions under the armrests 350R and 350L are inflated with a gas or liquid, such that it is possible to support the body of the occupant P in a wide range from the pelvis to the side of the occupant P.

Third Embodiment

Figure 13:
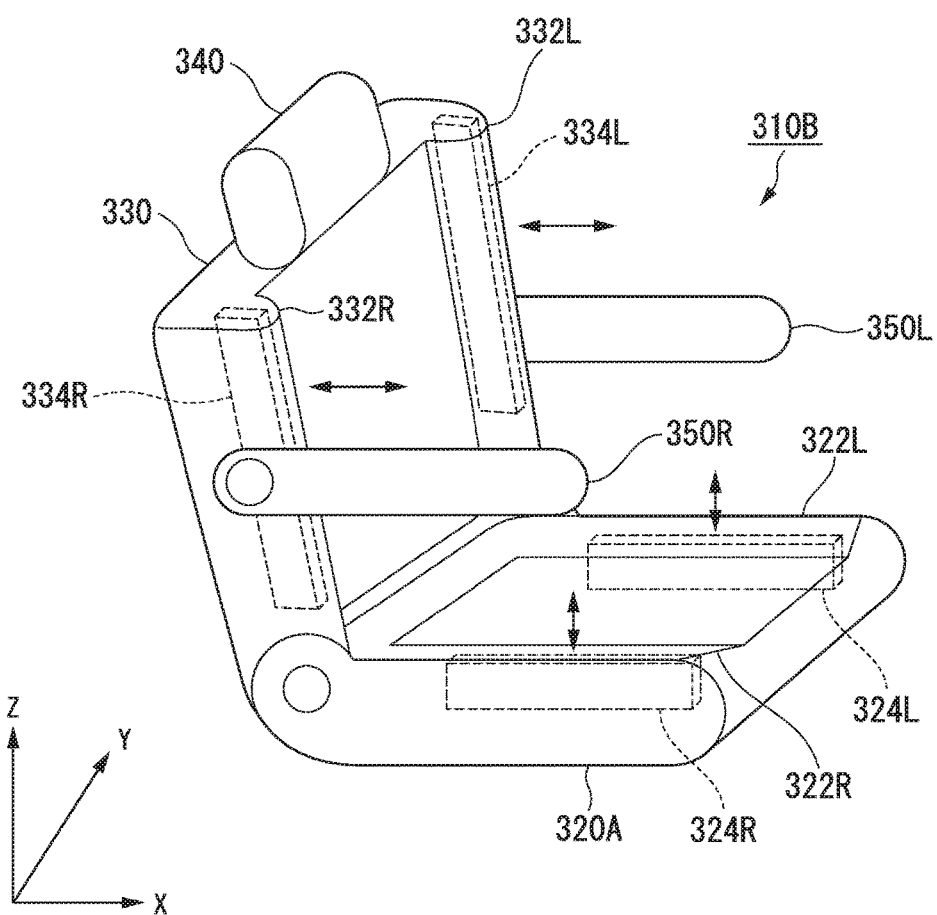
FIG. 13 is a view showing the operation of a seat of a third embodiment.

Next, a seat device of a third embodiment will be described. Hereinafter, configurations and operations relating to a sitting portion 320A will mainly be described and it is assumed that the other configurations are common to any one of the first and second embodiments. FIG. 13 is a view showing the operation of a seat 310B of the third embodiment. In addition to having the mechanisms for causing the side support portions 332 to protrude, the seat 310B of the third embodiment causes sitting-portion side support portions 322R and 322L provided on the right and left sides of a sitting portion 320A. For example, the sitting-portion side support portions 322R and 322L include protruding mechanisms 324R and 324L. The protruding mechanisms 324R and 324L are, for example, plate-like members. The seat control unit 180 controls driving of a motor (not shown) to move at least one of the protruding mechanisms 324R and 324L in a direction to support the body of the occupant (i.e., upward of the seat 310).

For example, in a case that the seat 310B is oriented backward and lateral acceleration acting on the vehicle M is equal to or greater than the fourth threshold value, for example, the seat control unit 180 deforms the sitting portion 320A by moving the protruding mechanism 324R or 324L located on the side opposite to the direction of the lateral acceleration in a direction to support the body of the occupant (i.e., upward of the seat 310B) in addition to deforming the side support portions 332R and 332. The seat control unit 180 returns the protruding mechanism 324R or 324L to its original position in a case that the seat 310B does not satisfy a condition for moving the protruding mechanism 324R or 324L to cause the sitting portion 320A to protrude, for example, in a case that the seat 310B is oriented forward.

In the third embodiment, instead of the protruding mechanism 324R or 324L described above, a bag-like member may be provided on the sitting portion 320A and the bag-like member may be extended upward to support the lower half of the body of the occupant P.

[Process Flow]

Figure 14:
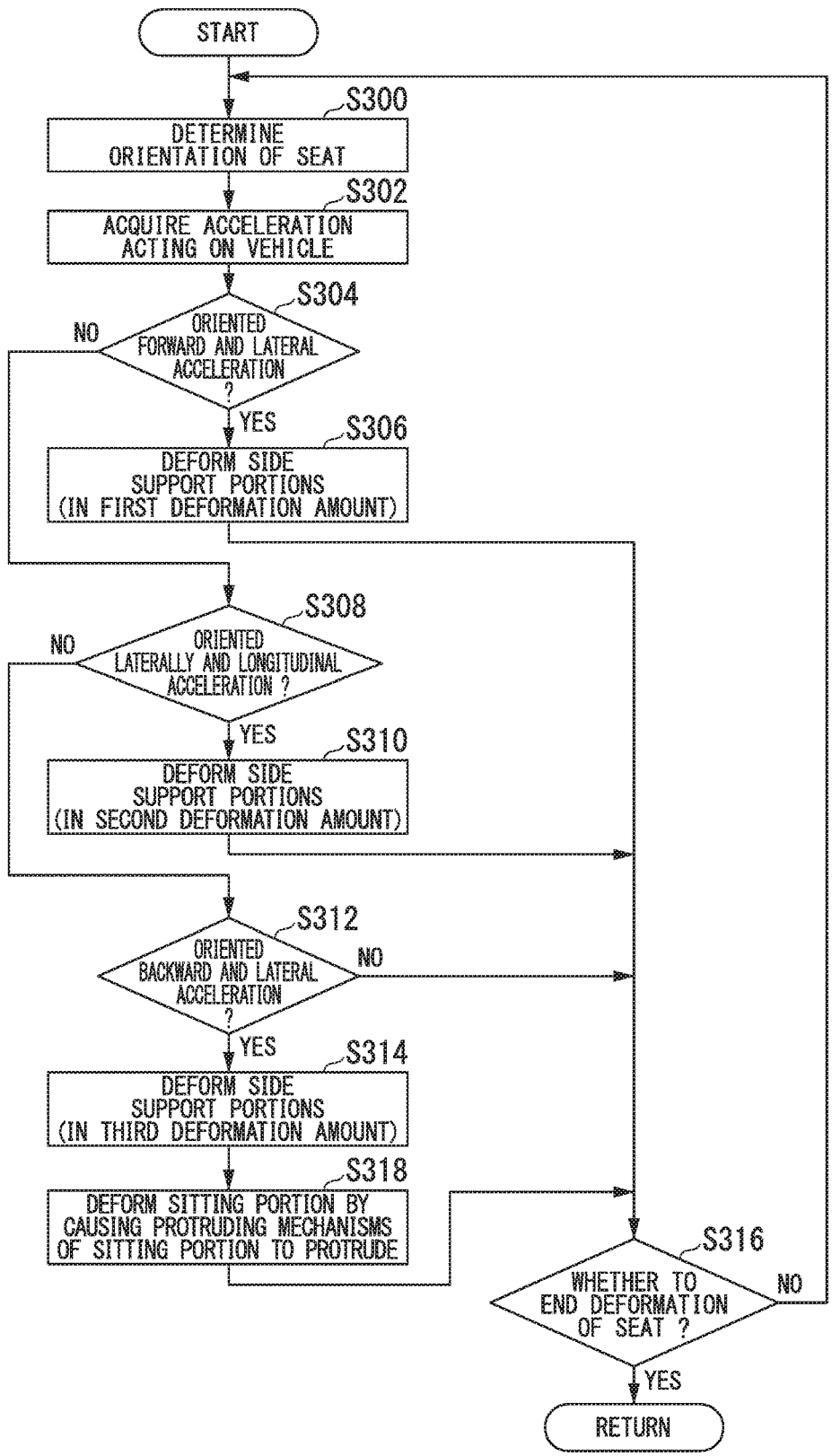
FIG. 14 is a flowchart showing a flow of seat control of the third embodiment.

Hereinafter, a flow of seat control of the third embodiment will be described. FIG. 14 is a flowchart showing a flow of seat control of the third embodiment. Steps S300 to S316 shown in FIG. 14 are similar to steps S100 to S116 shown in FIG. 9 described above and thus detailed descriptions thereof will be omitted.

Upon determining in the process of step S312 in FIG. 14 that the orientation of the seat 310B is backward and the lateral acceleration is equal to or greater than the fourth threshold value, the seat control unit 180 deforms the side support portions 332 in the third support amount (Step S314). Further, the seat control unit 180 deforms the sitting portion 320A by causing the protruding mechanisms 324 of the sitting portion 320A to protrude in a direction to support the body of the occupant in addition to deforming the side support portions 332 (step S318).

According to the third embodiment described above, the seat 310B can support not only the upper body of the body of the occupant but also the lower body and therefore it is possible to more securely support the occupant.

Fourth Embodiment

Figure 15:
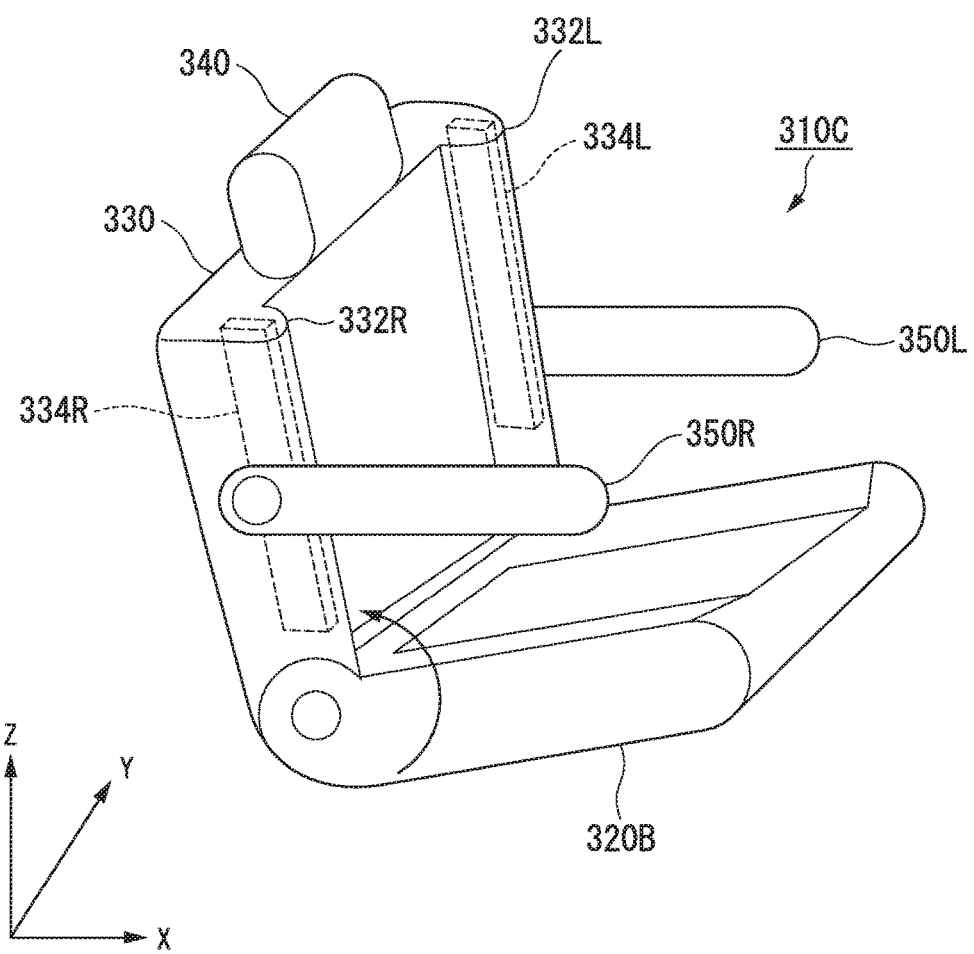
FIG. 15 is a view showing the operation of a seat of a fourth embodiment.

Next, a seat device of a fourth embodiment will be described. Hereinafter, configurations and operations relating to a sitting portion 320B will mainly be described and it is assumed that the other configurations are common to any one of the first to third embodiments. FIG. 15 is a view showing the operation of a seat 310C of the fourth embodiment. The seat 310C of the fourth embodiment has a mechanism for tilting the sitting portion 320B in addition to the mechanisms for protruding the side support portions 332.

For example, the seat control unit 180 deforms the side support portion 332R or 332L in a case that the seat 310C is oriented backward and lateral acceleration acting on the vehicle M is equal to or greater than the fourth threshold value. Further, in a case that the seat 310C is oriented backward and the longitudinal acceleration acting on the vehicle M is greater than or equal to a fifth threshold value, the seat control unit 180 further controls driving of a motor (not shown) to tilt the sitting portion 320B toward the backrest portion 330 by a predetermined angle about a connecting portion between the sitting portion 320B and the backrest portion 330 as the center, in addition to deforming the side support portion 332R or 332L. The predetermined angle may be a fixed value or may be varied according to the longitudinal acceleration. Thus, the seat 310C can suppress changes in the posture of the occupant P due to the longitudinal acceleration of the vehicle M.

[Process Flow]

Hereinafter, a flow of seat control of the fourth embodiment will be described. FIG. 16 is a flowchart showing a flow of seat control of the fourth embodiment. Steps S400 to S416 shown in FIG. 16 are similar to steps S100 to S116 shown in FIG. 9 described above and thus detailed descriptions thereof will be omitted.

Upon determining in the process of step S412 in FIG. 16 that the orientation of the seat 310C is backward and the lateral acceleration is equal to or greater than the fourth threshold value, the seat control unit 180 deforms the side support portions 332 in the third deformation amount (Step S414). Further, the seat control unit 180 determines whether or not the orientation of the seat 310B is backward and the longitudinal acceleration is equal to or greater than the fifth threshold value (step S418). Upon determining that the orientation of the seat 310B is backward and the longitudinal acceleration is equal to or greater than the fifth threshold value, the seat control unit 180 tilts the sitting portion 320B toward the backrest portion 330 (step S420).

According to the fourth embodiment described above, the sitting portion 320B can be tilted to move the posture of the occupant toward a direction in which the backrest portion 330 is present. Thus, it is possible to support the occupant in a wider range.

In the fourth embodiment, the seat control unit 180 may not only tilt the sitting portion 320B toward the backrest portion 330 but may also tilt the sitting portion 320B in a direction toward either the side support portion 332R or 332L. This allows the seat 310 to easily support the body of the occupant P by the protruded side support portion 332R or 332L.

Each of the first to fourth embodiments described above may be combined with some or all of the other embodiments. Each of the embodiments described above can also be applied to the case in which the vehicle M is performing manual driving.

<Modification>

Hereinafter, a modification will be described. For example, the seat control unit 180 may adjust the amount of deformation of the seat 310 by the side support portions 332, the armrests 350, or the sitting portion 320 described above in a case that the seat 310 is rotated about the vertical axis with reference to a direction exactly matching the travel direction of the vehicle M. In this case, the seat control unit 180 performs control such that the amount of deformation of the seat 310 is minimized in a case that a forward angle of the seat 310 exactly matches the travel direction of the vehicle M and increases with rotation of the seat 310 from that angle. The seat control unit 180 performs control such that the amount of deformation of the seat 310 is maximized in a case that the forward angle of the seat 310 exactly matches a direction opposite to the travel direction of the vehicle M. The seat control unit 180 performs control such that the amount of deformation decreases according to the angle of rotation of the seat 310 as the forward angle of the seat 310 returns to the travel direction of the vehicle M from the direction opposite to the travel direction of the vehicle M. Thus, the seat 310 can be smoothly deformed according to the rotation angle.

Although the modes for carrying out the present invention have been described above by way of embodiments, the present invention is not limited to these embodiments at all and various modifications and substitutions can be made without departing from the gist of the present invention.

What is claimed is:

1. A vehicle system comprising:
 a seat state acquisition unit configured to acquire an orientation about a vertical axis of a seat on which an occupant of a vehicle sits;
 a vehicle state acquisition unit configured to acquire a current or future acceleration relating to the vehicle; and
 a seat control unit configured to deform at least a part of the seat on the basis of the orientation of the seat detected by the seat state acquisition unit and the acceleration acquired by the vehicle state acquisition unit,
 wherein the seat includes a plurality of side support portions configured to support a body of the occupant at different sides, and the seat control unit is configured to deform at least one side support portion of the plurality of side support portions which corresponds to a combination of the orientation of the seat and a direction of the current or future acceleration relating to the vehicle acquired by the vehicle state acquisition unit,
 wherein the seat control unit makes an amount of deformation of the at least one side support portion in a case that a longitudinal acceleration acts on the vehicle in a case in which the orientation of the seat detected by the seat state acquisition unit is not forward with respect to a travel direction of the vehicle greater than an amount of deformation of the at least one side support portion in a case that a lateral acceleration acts on the vehicle in a case in which the orientation of the seat is forward with respect to the travel direction of the vehicle.

2. The vehicle system according to claim 1, wherein the seat control unit causes one of the plurality of side support portions, which is located on a side opposite to a direction in which a lateral acceleration acts on the vehicle, to protrude toward the occupant.

3. The vehicle system according to claim 1, wherein the seat control unit makes an amount of deformation of the at least one side support portion in a case that a longitudinal acceleration acts on the vehicle in a case in which the orientation of the seat detected by the seat state acquisition unit is lateral with respect to a travel direction of the vehicle greater than an amount of deformation of the at least one side support portion in a case that a lateral acceleration acts on the vehicle in a case in which the orientation of the seat is forward with respect to the travel direction of the vehicle.

4. The vehicle system according to claim 1, wherein the seat includes an armrest for supporting an arm of the occupant, and
the seat control unit is configured to deform the armrest in addition to deforming the at least one side support portion in a case that the future acceleration acquired by the vehicle state acquisition unit is equal to or greater than a threshold value.

5. The vehicle system according to claim 4, wherein the armrest includes a bag-like member configured to store a gas or liquid, and
the seat control unit is configured to inject the gas or liquid into the bag-like member to expand the bag-like member downward from the armrest.

6. The vehicle system according to claim 1, wherein the seat control unit is configured to tilt a sitting portion of the seat in addition to deforming the at least one side support portion in a case that a future longitudinal acceleration acquired by the vehicle state acquisition unit is equal to or greater than a threshold value in a case in which the orientation of the seat detected by the seat state acquisition unit is backward with respect to a travel direction of the vehicle.

7. The vehicle system according to claim 1, wherein the seat control unit makes an amount of deformation of the at least one side support portion in a case that a longitudinal acceleration acts on the vehicle in a case in which the orientation of the seat detected by the seat state acquisition unit is backward with respect to a travel direction of the vehicle greater than an amount of deformation of the at least one side support portion in a case that a lateral acceleration acts on the vehicle in a case in which the orientation of the seat is forward with respect to the travel direction of the vehicle.

8. The vehicle system according to claim 7, wherein the seat control unit makes an amount of deformation of the at least one side support portion in a case that a longitudinal acceleration acts on the vehicle in a case in which the orientation of the seat detected by the seat state acquisition unit is backward with respect to the travel direction of the vehicle greater than an amount of deformation of the at least one side support portion in a case that a lateral acceleration acts on the vehicle in a case in which the orientation of the seat is lateral with respect to the travel direction of the vehicle.

9. A vehicle control method using an in-vehicle computer, comprising:
acquiring an orientation about a vertical axis of a seat on which an occupant of a vehicle sits;
acquiring a current or future acceleration relating to the vehicle;
deforming at least a part of the seat on the basis of the acquired orientation of the seat and the acquired acceleration;
wherein the seat includes a plurality of side support portions configured to support a body of the occupant at different sides, and
deforming the at least a part of the seat comprises deforming at least one side support portion of the plurality of side support portions which corresponds to a combination of the orientation of the seat and a direction of the current or future acceleration relating to the vehicle acquired; and
making an amount of deformation of the at least one side support portion in a case that a longitudinal acceleration acts on the vehicle in a case in which the orientation of the seat is not forward with respect to a travel direction of the vehicle greater than an amount of deformation of the at least one side support portion in a case that a lateral acceleration acts on the vehicle in a case in which the orientation of the seat is forward with respect to the travel direction of the vehicle.

10. A non-transitory computer-readable storage medium configured to store a vehicle control program causing an in-vehicle computer to:
acquire an orientation about a vertical axis of a seat on which an occupant of a vehicle sits;
acquire a current or future acceleration relating to the vehicle;
deform at least a part of the seat on the basis of the acquired orientation of the seat and the acquired acceleration,
wherein, the seat includes a plurality of side support portions configured to support a body of the occupant at different sides, and
deforming the at least a part of the seat comprises deforming at least one side support portion of the plurality of side support portions which corresponds to a combination of the orientation of the seat and a direction of the current or future acceleration relating to the vehicle acquired; and
make an amount of deformation of the at least one side support portion in a case that a longitudinal acceleration acts on the vehicle in a case in which the orientation of the seat is not forward with respect to a travel direction of the vehicle greater than an amount of deformation of the at least one side support portion in a case that a lateral acceleration acts on the vehicle in a case in which the orientation of the seat is forward with respect to the travel direction of the vehicle.

11. A vehicle system comprising:
a seat state acquisition unit configured to acquire an orientation about a vertical axis of a seat on which an occupant of a vehicle sits;
a vehicle state acquisition unit configured to acquire a current or future acceleration relating to the vehicle; and
a seat control unit configured to deform at least a part of the seat on the basis of the orientation of the seat detected by the seat state acquisition unit and the acceleration acquired by the vehicle state acquisition unit, wherein the seat includes a plurality of side support portions configured to support a body of the occupant at different sides, and the seat control unit is configured to deform at least one side support portion of the plurality of side support portions which corresponds to a combination of the orientation of the seat and a direction of the current or future acceleration relating to the vehicle acquired by the vehicle state acquisition unit, wherein the seat control unit is configured to tilt a sitting portion of the seat in addition to deforming the at least one side support portion in a case that a future longitudinal acceleration acquired by the vehicle state acquisition unit is equal to or greater than a threshold value in a case in which the orientation of the seat detected by the seat state acquisition unit is backward with respect to a travel direction of the vehicle.

* * * * *